United States Patent [19]

Kumagai et al.

[11] Patent Number: 4,985,328

[45] Date of Patent: Jan. 15, 1991

[54] DRY TONER, DRY DEVELOPER AND PROCESS FOR FORMING ELECTROPHOTOGRAPHIC IMAGES

[75] Inventors: Yuugo Kumagai; Ryouji Tan, both of Hitachi; Takashi Ikeda, Katsuta; Tetsuya Fujii, Hitachi; Chiaki Okada, Hitachi; Osamu Higashida, Hitachi; Hatuo Sugitani, Ibaraki; Masato Fukasawa, Hitachi, all of Japan

[73] Assignee: Hitachi Chemical Co., Ltd., Tokyo, Japan

[21] Appl. No.: 410,416

[22] Filed: Sep. 21, 1989

[30] Foreign Application Priority Data

| | | | |
|---|---|---|---|
| Sep. 22, 1988 | [JP] | Japan | 63-237890 |
| Nov. 22, 1988 | [JP] | Japan | 63-295731 |
| Jan. 13, 1989 | [JP] | Japan | 1-007099 |
| Mar. 28, 1989 | [JP] | Japan | 1-075892 |
| Mar. 28, 1989 | [JP] | Japan | 1-075893 |
| Apr. 19, 1989 | [JP] | Japan | 1-099170 |
| Apr. 28, 1989 | [JP] | Japan | 1-111194 |
| Apr. 28, 1989 | [JP] | Japan | 1-111195 |
| May 10, 1989 | [JP] | Japan | 1-116589 |
| May 18, 1989 | [JP] | Japan | 1-124980 |

[51] Int. Cl.[5] .......................... G02G 9/08; G02G 9/14

[52] U.S. Cl. ................................ 430/110; 430/106.6; 430/903

[58] Field of Search ...................... 430/110, 903, 106.6

[56] References Cited

U.S. PATENT DOCUMENTS

| | | | |
|---|---|---|---|
| 3,320,169 | 5/1967 | East | 430/110 |
| 4,206,064 | 6/1980 | Kiuchi | 430/110 X |
| 4,404,271 | 9/1983 | Kawagishi | 430/110 |
| 4,433,040 | 2/1984 | Niimura | 430/110 X |
| 4,563,409 | 1/1986 | Suzuki | 430/110 X |
| 4,873,185 | 10/1989 | Uchida | 430/110 X |

*Primary Examiner*—David Welsh
*Attorney, Agent, or Firm*—Antonelli, Terry, Stout & Kraus

[57] ABSTRACT

A dry toner composition comprising (A) a binder resin, (B) a colorant and (C) charge control agents comprising a special metal complex of oxycarboxylic acid (C-1) and a special metal complex of azo compound (C-2) can provide high quality images without causing toner flying even after printed for a long period of time, and thus is useful for providing a dry developer and a process for forming images using said dry developer.

31 Claims, No Drawings

DRY TONER, DRY DEVELOPER AND PROCESS FOR FORMING ELECTROPHOTOGRAPHIC IMAGES

BACKGROUND OF THE INVENTION

This invention relates to a dry toner and a dry developer used in fields of electrophotography, electrostatic recording, etc., and a process for forming images. More particularly, the present invention relates to a negative charge dry toner and a dry developer effectively used in a high-speed continuous paper (or serial) printer wherein a peripheral speed of a photoreceptor is 25 cm/sec or more, particularly 50 cm/sec or more, a high-speed cut sheet printer wherein a peripheral speed of a photoreceptor is 25 cm/sec or more and a printing speed of 60 sheets/min or more, a printer including a photoreceptor made of an organic photoconductive substance, and the like, and a process for forming images using such materials.

An electrophotographic process generally comprises a charging step for uniformly providing static charge on a photoreceptor using a photoconductive substance, an exposing step for forming a static latent image by irradiating a light, a developing step for attaching a toner to latent image portions, a transferring step for transferring to a toner image support, a fixing step for fixing the toner image to the image support with heat, pressure, flash light, or the like, a cleaning step for removing excess toner remaining on the photoreceptor, and a discharging step for returning to an original state as disclosed in U.S. Pat. No. 2,297,691 and British Patent Nos. 1,165,406 and 1,165,405. These steps are repeated to give a plurality of printed matters.

As toners for electrostatic image development used in the field of electrophotography, there have been proposed toners using polystyrene resins (Japanese Patent Examined Publication No. 44-16118), toners using styrene-acrylic resins such as toners using styrene-butyl methacrylate copolymer resin (Japanese Patent Examined Publication No. 56-11143), toners using bisphenol type epoxy resins obtained by reacting bisphenol and epichlorohydrin (Japanese Patent Unexamined Publication No. 57-96354), toners using polyester resins obtained by reacting a glycol having a bisphenol skeleton with a polybasic acid (Japanese Patent Examined Publication No. 52-25420), and the like. Among these others, the styrene-acrylic resins can widely been controlled to give proper resin properties such as molecular weights, glass transition points, molten viscosities, etc. and are extremely advantageous in designing toners, so that they have been used in large part as toners.

In order to provide desirable negative charge to these toners, there have been proposed to add substances for providing the negative charge to the resins to be bonded, for example, metal complexes of azo compounds (Japanese Patent Unexamined Publication Nos. 57-141452, 58-111049, 58-208750, etc.), metal complexes of oxycarboxylic acids (Japanese Patent Unexamined Publication Nos. 53-127726, 57-104940, 61-69073, etc.), halogenated paraffins (Japanese Patent Unexamined Publication Nos. 48-97542, 50-68140, etc.). It is also possible to prepare toner particles, followed by mixing a silica powder with the toner particles to adhere the silica powder to surface layers of toner particles.

These toners can be applied to appliances applying an electrophotographic method such as printers, copying machines, facsimiles. Particularly, in recent years, printers are increasingly used as terminals of computers for treating various information with high speed.

The printers can be divided into two types depending on kinds of paper used, i.e. a cut sheet printer wherein paper cut into predetermined size such as A4, B4, letter and legal sizes is used as a toner image support, and a continuous paper printer wherein continuous paper is used as a toner image support. The cut sheet printer is widely used for its advantages in that printing can be made on both front and rear sides of sheet of paper, high density printing is possible, handling is easy, and the like.

As photoconductive substances used in the above-mentioned appliances, inorganic substances such as amorphous selenium, zinc oxide, titanium oxide, cadmium sulfide, etc. heretofore used are replaced markedly by organic photoconductive substances having no problem in toxicity, excellent in transparency, flexibility and light weight, and being able to be produced inexpensively. A photoconductive member containing a photoconductive substance comprises an electroconductive layer and a photosensitive layer formed thereon. In organic photoconductive members, a function separation type comprising a charge generating layer and a charge transport layer has been evaluated recently due to excellency in sensitivity.

Generally speaking, as organic compounds generating electric charge and contained in the charge generating layer, there are known pigments such as azoxybenzene series, disazo series, trisazo series, benzimidazole series, polycyclic quinoline series, indigoid series, quinacridone series, phthalocyanine series, perylene series, methine series, etc. (Japanese Patent Unexamined Publication Nos. 47-37543, 47-37544, 47-18543, 47-18544, 48-43942, 48-70538, 49-1231, 49-105536, 50-75214 and 50-92738). As organic compounds for transporting electric charge and contained in the charge transport layer, there are known pyrazoline derivatives [Journal of Photographic Science and Engineering, vol. 21, (2), p. 73 (1977)], oxazole derivatives (Japanese Patent Unexamined Publication Nos. 55-35319, 58-87557, and 58-182640), hydrazone derivatives (Japanese Patent Unexamined Publication Nos. 54-59143, 54-150128 and 55-46760), enamine derivatives (Journal of Imaging Science, vol. 29 (1), p. 7 1985), etc.

Toners heretofore used in such electrophotographic members containing an organic photoconductive layer have no problem in initial printing, but when several thousands of sheets are printed, there are readily generated printing obstacles such as lowering in printed letter density, unevenness of printed letter density, and unable to obtain visible images.

Further, the toners heretofore used generally have no problem in charging properties, but cause various troubles after repeated uses such as flying (or scattering) of toners due to lowering in charging properties, resulting in generating contamination of inside and outside of the appliances and contamination of back portions of printed letters (hereinafter referred to as "fogging"), or lowering in printed letter density due to too high charging properties, resulting in difficulty in reading. These troubles are particularly undesirable in printers for printing important papers such as insurances, accounts, resident cards, articles, etc., due to their special uses. These problems seem to occur often in high-speed printers wherein impact strength, frictional force and centrifugal force for toners are great, and peripheral speed of organic photoconductor (OPC) is 250 mm/sec or more.

Further, in the case of the cut sheet printer, there are some problems in comparison with the continuous paper printer. For example, in the case of transferring a toner image from a photoreceptor to an image support such as paper, counter polar electric charge with respect to toner is applied from the back side of the image support depending on transferring devices. In such a case, when the electric charge is larger, the transferring effect of toner is enhanced to obtain high quality images, but the probability of generating so-call "Jam", which is a phenomenon making the image support adhere to the transferring device, is enhanced. On the other hand, when the electric charge from the transferring device is made smaller, no jam is generated, but the transferring amount of toner is small to produce poor images. Further, when the back side is printed after printing front side and fixing step, there readily takes place disturbance of images accompanying water content change in the image support and generation of fine wrinkles.

SUMMARY OF THE INVENTION

It is an object of the present invention to provide a toner solving the problems mentioned above, without generating printing obstacles when used in electrophotographic members having an organic photoconductive layer, having printing density and resistance to fogging necessary as toners, and having a long life bearable for a long period of use, as well as a developer, and a process for forming an image using the same.

It is another object of the present invention to provide a toner which is effective for high speed printers, generating no jam even if used in cut sheet printers and causing no disturbance of images, as well as a developer, and a process for forming an image using the same.

The present invention provides a dry toner composition comprising (A) a binder resin, (B) a colorant, and (C) charge control agents comprising a metal complex of oxycarboxylic acid (C-1) represented by the formula:

(I)

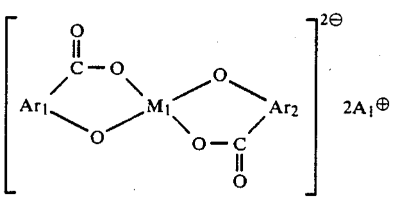

wherein $Ar_1$ and $Ar_2$ are independently a residue of an aromatic oxycarboxylic acid or a derivative thereof; $M_1$ is a chromium or zinc atom; $A_1^\oplus$ is a hydrogen ion, a sodium ion, a potassium ion or an ammonium ion, a metal complex of azo compound (C-2) represented by the formula:

(II)

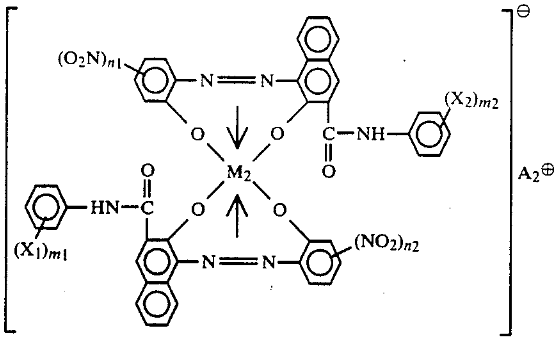

wherein $X_1$ and $X_2$ are independently hydrogen, an alkyl group having 1 to 4 carbon atoms, an alkoxy group having 1 to 4 carbon atoms, a nitro group, or a halogen atom; $m_1$ and $m_2$ are independently an integer of 1 to 3; $n_1$ and $n_2$ are independently an integer of 1 or 2; $M_2$ is a chromium or zinc atom; and $A_2^\oplus$ is a hydrogen ion, a sodium ion, a potassium ion, or an ammonium ion, and/or that represented by the formula:

(III)

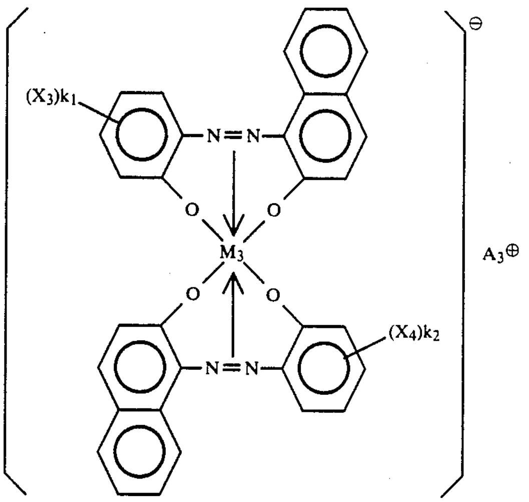

wherein $X_3$ and $X_4$ are independently $-NO_2$, $-CH_3$, $-SO_3H$ $-Cl$ or $-SO_2NH_2$; $k_1$ and $k_2$ are independently an integer of 1 or 2; $M_3$ is a chromium or zinc atom; and $A_3^\oplus$ is a hydrogen ion, a sodium ion, a potassium ion, or an ammonium ion, the weight ratio of (C-1)/(C-2) being 1/9 to 9/1, and a total weight of (C-1) and (C-2) being 0.5 to 5% by weight.

Taking the above-mentioned dry toner composition as a toner matrix, the present invention also provide a dry toner composition obtained by mixing the toner matrix with 0.1 to 1% by weight of a silica powder and 0.05 to 2% by weight of a magnetic powder, each based on the weight of the toner matrix.

The present invention further provides a dry toner composition obtained by mixing the toner matrix with 0.1 to 1% by weight of a silica powder, 0.05 to 2% by weight of a magnetic powder, and 0.01 to 0.5% by weight of a metal salt of fatty acid, each based on the weight of the toner matrix.

The present invention still further provides a dry developer comprising a dry toner composition mentioned above and a carrier, and a process for forming images using the dry developer.

DESCRIPTION OF THE PREFERRED EMBODIMENTS

As the binder resin (A) of the dry toner composition, there can preferably be used styrene-acrylic resins or polyester resins. Particularly, binder resins using a styrene-acrylic resin as a major component are preferable.

As monomers for producing the styrene-acrylic resins, there can be used the following ones.

Styrene, α-methyl styrene, p-methyl styrene, p-t-butyl styrene, p-chloro styrene, hydroxy styrene, and the like styrene derivatives, methacrylic acid, methyl methacrylate, ethyl methacrylate, propyl methacrylate, butyl methacrylate, pentyl methacrylate, hexyl methacrylate, heptyl methacrylate, octyl methacrylate, nonyl methacrylate, decyl methacrylate, undecyl methacrylate, dodecyl methacrylate, glycidyl methacrylate, methoxyethyl methacrylate, propoxyethyl methacrylate, butoxyethyl methacrylate, methoxydiethylene glycol methacrylate, ethoxydiethylene glycol methacrylate, methoxyethylene glycol methacrylate, butoxytriethylene glycol methacrylate, methoxydipropylene glycol methacrylate, phenoxyethyl methacrylate, phenoxydiethylene glycol methacrylate, phenoxytetraethylene glycol methacrylate, benzyl methacrylate, cyclohexyl methacrylate, tetrahydrofurfuryl methacrylate, dicyclopentenyl methacrylate, dicyclopentenyloxyethyl methacrylate, N-vinyl-2-pyrrolidone methacrylate, methacrylonitrile, methacrylamide, N-methylol methacrylamide, 2-hydroxyethyl methacrylate, hydroxypropyl methacrylate, hydroxybutyl methacrylate, 2-hydroxy-3-phenyloxypropyl methacrylate, phthalimidoethyl methacrylate, phthalimidopropyl methacrylate, morpholinoethyl methacrylate, morpholinopropyl methacrylate, dimethylaminoethyl methacrylate, diethylaminoethyl methacrylate, diacetone methacrylamide, acrylic acid, methyl acrylate, ethyl acrylate, propyl acrylate, butyl acrylate, pentyl acrylate, hexyl acrylate, butyl acrylate, octyl acrylate, nonyl acrylate, decyl acrylate, undecyl acrylate, dodecyl acrylate, glycidyl acrylate, methoxyethyl acrylate, propoxyethyl acrylate, butoxyethyl acrylate, methoxydiethylene glycol acrylate, ethoxydiethylene glycol acrylate, methoxyethylene glycol acrylate, butoxytriethylene glycol acrylate, methoxydipropylene glycol acrylate, phenoxyethyl acrylate, phenoxydiethylene glycol acrylate, phenoxytetraethylene glycol acrylate, benzyl acrylate, cyclohexyl acrylate, tetrahydrofurfuryl acrylate, dicyclopentenyl acrylate, dicyclopentenyloxyethyl acrylate, N-vinyl-2-pyrrolidone acrylate, hydroxyethyl acrylate, hydroxypropyl acrylate, hydroxybutyl acrylate, 2-hydroxy-3-phenyloxypropyl acrylate, glycidyl acrylate, acrylonitrile, acrylamide, N-methylol acrylamide, diacetone acrylamide, vinylpyridine, phthalimidoethyl acrylate, phthalimidopropyl acrylate, morpholinoethyl acrylate, morpholinopropyl acrylate, dimethylaminoethyl acrylate, diethylaminoethyl acrylate, divinylbenzene, reaction products of a glycol and methacrylic acid or acrylic acid, for example, ethylene glycol dimethacrylate, 1,3-butylene glycol dimethacrylate, 1,4-butanediol dimethacrylate, 1,5-pentanediol dimethacrylate, 1,6-hexanediol dimethacrylate, neopentyl glycol dimethacrylate, diethylene glycol dimethacrylate, triethylene glycol dimethacrylate, polyethylene glycol dimethacrylate, tripropylene glycol dimethacrylate, hydroxypivalic acid neopentyl glycol ester dimethacrylate, trimethylolethane trimethacrylate, trimethylolpropane trimethacrylate, pentaerythritol trimethacrylate, pentaerythritol tetramethacrylate, trismethacryloxyethyl phosphate, bis(methacryloyloxyethyl) hydroxyethyl isocyanurate, tris(methacryloyloxyethyl) isocyanurate, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, polyethylene glycol diacrylate, tripropylene glycol diacrylate, hydroxypivalic acid neopentyl glycol diacrylate, trimethylolethane triacrylate, trimethylolpropane triacrylate, pentaerythritol acrylate, pentaerythritol tetraacrylate, trisacryloxyethyl phosphate, bis(methacryloyloxyethyl) hydroxyethyl isocyanurate, tris(methacryloyloxyethyl-)isocyanurate, a half-esterified product of glycidyl methacrylate and methacrylic acid or acrylic acid, a half-esterified product of a bisphenol type epoxy resin and methacrylic acid or acrylic acid, a half-esterified product of glycidyl acrylate and methacrylic acid or acrylic acid, etc.

Among these monomers, preferred ones are styrene, a styrene derivative, a methacrylic acid ester and an acrylic acid ester among monomers having one vinyl group in the molecule. Particularly preferable monomers are alkyl esters of methacrylic acid or acrylic acid, the alkyl moiety having 1 to 5 carbon atoms.

Among monomers having two or more vinyl groups in the molecule, preferable ones are divinylbenzene, dimethacrylates or diacrylates of alkylene glycols having 2 to 6 carbon atoms. These monomers can usually be used in an amount of 0 to 20% by weight based on the weight of the total monomers.

The binder resin (A) can be obtained by polymerizing a mixture of various monomers, for example, by solution polymerization, bulk polymerization, emulsion polymerization, suspension polymerization, or the like.

As a polymerization initiator usable in such polymerization, there can be used conventional ones such as acetyl peroxide, decanoyl peroxide, lauroyl peroxide, benzoyl peroxide, p-chlorobenzoyl peroxide, 2,4-dichlorobenzoyl peroxide, diisopropyl perdicarbonate, di-2-ethylhexyl perdicarbonate, acetylcyclohexane sulfonyl peroxide, tert-butyl peracetate, tert-butyl perisobutyrate, azobisisobutyronitrile, 2,2'-azobis-2,4-dimethylvaleronitrile, 2,2'-azobis-4-methoxy-2,4-dimethylvaleronitrile, tert-butyl per-2-ethylhexanoate, tert-butyl perbenzoate, etc. Such a polymerization initiator can be used in an amount of 0.1 to 15% by weight based on the total weight of the monomers used. It is preferable to use such a polymerization initiator by dissolving it in a monomer or monomers.

As to the styrene-acrylic resin, it is preferable to control the contents of unreacted monomers and solvent in the resin in amounts of 0.15% by weight or less. When a resin containing unreacted monomers and solvent in amounts of more than 0.15% by weight is used in a toner composition, there often takes place a phenomenon of causing lowering in density in portions corresponding to non-printed portion in a previous printing pattern, when the printing pattern is changed for printing after printing repeatedly several thousands of sheets with the printing pattern.

In the case of using a polyester resin as the binder resin (A), there can be used the following raw materials for preparing the polyester resin.

(i) Alcohol component

Diols represented by the formula:

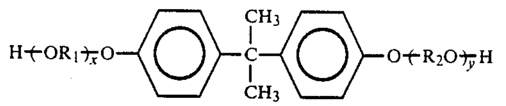

wherein $R_1$ and $R_2$ are independently an ethylene group or a propylene group; x and y are independently an integer of 1 or more and x+y is 2 to 7 in average, such as polyoxypropylene(2.2)-2,2-bis(4-hydroxyphenyl)propane, polyoxypropylene(3.3)-2,2-bis(4-hydroxyphenyl)-propane, polyoxyethylene(2.0)-2,2-bis(4-hydroxyphenyl)propane, polyoxypropylene(2.0)-polyoxyethylene(2.0)-2,2-bis(4-hydroxyphenyl)propane, etc.; ethylene glycol, diethylene glycol, triethylene glycol, polyethylene glycol, propylene glycol, dipropylene glycol, isopentyl glycol, hydrogenerated bisphenol A, 1,3-butanediol, 1,4-butanediol, neopentyl glycol, xylene glycol, 1,4-cyclohexane dimethanol, glycerine, trimethylolethane, trimethylolpropane, pentaerythritol, bis(β-hydroxyethyl) terephthalate, tris(β-hydroxyethyl-)isocyanurate, 2,2,4-trimethylpentane-1,3-diol, etc. alone or as a mixture thereof.

It is possible to add an oxycarboxylic acid such as p-oxybenzoic acid, vanillic acid, dimethylolpropionic acid, malic acid, tartaric acid, 5-hydroxyisophthalic acid, etc.

(ii) Acid component:

Malonic acid, succinic acid, glutaric acid, dimer acid, phthalic acid, isophthalic acid, dimethyl isophthalate, dibutyl terephthalate, monomethyl terephthalate, tetrahydrophthalic acid, methyltetrahydrophthalic acid, hexahydrophthalic acid, dimethyltetrahydrophthalic acid, endomethylenehexahydrophthalic acid, naphthalenetetracarboxylic acid, diphenolic acid, trimellitic acid, pyromellitic acid, trimesic acid, cyclopentanedicarboxylic acid, 3,3', 4,4'-benzophenonetetracarboxylic acid, 1,2,3,4-butanetetracarboxylic acid, 2,2'-bis(4-carboxyphenyl)propane, diimidocarboxylic acid obtained from trimellitic anhydride and 4,4'-diaminophenylmethane, tris(β-carboxyethyl) isocyanurate, isocyanurate ring-containing polyimide polycarboxylic acid obtained from isocyanurate ring-containing polyisocyanurate and trimellitic anhydride, e.g. isocyanurate ring-containing polyimide polycarboxylic acid obtained from trimetallization product of tolylene diisocyanate, xylylene diisocyanate or isophorone diisocyanate and trimellitic anhydride.

These acid components can be used alone or as a mixture thereof.

By adding monovalent carboxylic acid or monohydric alcohol to a part of constituting components of the polyester resin, pigment dispersing properties and adhesion of the polyester resin can be improved.

Examples of the monovalent carboxylic acid are phenylacetic acid, o-toluic acid, cyclohexanecarboxylic acid, capric acid, lauric acid, myristic acid, palmitic acid, stearic acid, benzoic acid, p-tert-butylbenzoic acid, etc.

Examples of the monohydric alcohol are stearyl alcohol, lauryl alcohol, ethyl Cellosolve, butyl Cellosolve, methyl carbitol, butyl carbitol, benzyl alcohol, etc.

Such a carboxylic acid or alcohol is added preferably in an amount of 0.1 to 10.0% by weight, more preferably 0.5 to 5.0% by weight, based on the total weight of the components charged. When the amount is less than 0.1% by weight, the improving effect is hardly expected, while when the amount is more than 10.0% by weight, there is a tendency to lower resistance to blocking.

The polyester resin can be produced from these raw materials by a conventional process. For example, an acid component and an alcohol component are charged into a reactor in predetermined proportions and subjected to reaction at 150° to 190° C. while introducing an inert gas such as $N_2$ gas into the reactor. By-produced low molecular weight compounds are removed out of the reaction system continuously. Then, the reaction temperature is raised to 210° to 250° C. to accelerate the reaction to yield the desired polyester resin. When a free carboxylic acid containing no ester group is used, it is preferable to use an organic metallic compound such as dibutyl tin dilaurate, dibutyl tin oxide, etc., or a metal alkoxide such as tetrabutyl titanate, in an amount of 0.1 to 1% by weight based on the total weight of whole raw materials. When a lower alkyl ester of carboxylic acid is used as the acid component, it is preferable to use an ester exchange catalyst such as a metal salt of acetic acid, e.g. zinc acetate, lead acetate, magnesium acetate, etc., a metal oxide, e.g. zinc oxide, antimony oxide, or a metal alkoxide, e.g. tetrabutyl titanate, in an amount of 0.005 to 0.05% by weight based on the total weight of whole raw materials.

It is particularly preferable that the binder resin (A) has a glass transition temperature of 50° to 90° C. When the glass transition temperature is lower than 50° C., caking (a phenomenon of agglomeration of toner particles to form bulks) easily takes place during storage of the toner composition or in a developing device. On the other hand, when the glass transition temperature is higher than 90° C., there is a tendency to lower productivity, since a much more time is necessary in a pulverizing step in the case of producing the toner composition by the steps of melt kneading, pulverizing and classification. Further, when the fixing of toners to a transferring material is carried out by a heat roll method or an open method, it is necessary to raise the fixing temperature. This is contrary to the requirement of saving energy.

The dry toner composition may further contain one or more other resins as the binder resin (A).

Examples of the other resins are silicone resins such as KR-216, KR-220, KR-152, KR-271, and KR-255 (mfd. by Shin-etsu Chemical Industry Co., Ltd.), SR-2400, SR-2406, and SH-840 (mfd. by Toray Silicone Co., Ltd.); norbornene series polymers such as 1-Solex (mfd. by CdF Chemical Co., Ltd.); polyester carbonates such as C-200A and C-250A (mfd. by Mitsubishi Kasei Corp.), Iupilon P-1000 (mfd. by Mitsubishi Gas Chemical Co., Inc.); xylene resins such as Lignol R-70, R-120, R-140 and P-2 (mfd. by Lignyte Co., Ltd.); epoxy resins such as Epikote 1004, 1007, 1009, 1010, YL-903, 906 and Epikote 604 (mfd. by Shell Chemical Co.), Epomix R304, R307 and R309 (mfd. by Mitsui Petrochemical Industries, Ltd.); diene series resins such as Nipol BR-1220, 1032, 1441, Nipol IR2200, Nipol NBR, 2057A and 2007J (mfd. by the Japanese Geon Co., Ltd.); polyester resins such as PC.RESIN 2H, 3H, 8H and 11A (mfd. by Hitachi Chemical Co., Ltd.), ATR 2005, 2009, 2010, HTR-1, and HTR-2 (mfd. by Kao Corp.), FC 017, 034, 035 and 036 (mfd. by Mitsubishi Rayon Co., Ltd.); phenol resins, terpene resins, coumarone resins, amide resins, amide-imide resins, butyral resins, amino resins, urethane resins, ethylene-vinyl acetate copolymer, ethylene-acryl ester copolymers, etc. It is preferable to use other resins in an amount of 0 to 30% by weight in the toner composition in addition to the major component of styrene-acrylic resin.

The binder resin (A) preferably contains unreacted monomers and/or solvent in an amount of 0.15% by weight or less. When the amount is more than 0.15% by weight, there is a tendency to raise the probability of generating printing obstacles such as lowering in printing density and unevenness of printed letter density.

The amounts of unreacted monomers and/or solvent can be measured by gas chromatographic method, or the like. For example, individual residual unreacted monomers and residual solvent can be determined quantitatively by preparing calibration curves of individual monomers and the solvent using gas chromatograph, dissolving the resulting copolymer in a predetermined amount of solvent, subjecting to measurement by gas chromatography, and determining the amounts of individual unreacted monomers and the residual solvent using the calibration curves. In the Examples mentioned below, the residual unreacted monomers and the residual solvent are measured by this method.

The content of the binder resin (A) is preferably 60 to 94.5% by weight based on the weight of the toner composition (toner matrix). When the content is less than 60% by weight, there is a tendency to weaken adhesive strength of the toner composition to a toner image support, to cause damage of toner images in the case of creasing or rubbing a toner image support, resulting in causing printing troubles. On the other hand, when the content is more than 94.5% by weight, poor printing quality is resulted due to insufficient hiding power of toner image.

As the colorant (B), there can be used the following pigments and dyes, alone or as a mixture thereof.

Black colorants

Carbon black, nigrosine dye, acetylene black, aniline black, cyanine black, graphite, black iron oxide, etc.

Yellow colorants

Chrome yellow pigment, cadmium yellow, yellow iron oxide, titanium yellow, naphthol yellow, Hansa yellow, Pigment Yellow, benzidine yellow, Permanent Yellow, Quinoline Yellow Lake, Anthrapyrimidine Yellow, etc.

Orange colorants

Permanent Orange, molybdenum orange, Vulcan Fast Orange, benzidine orange, Indanthrene Brilliant Orange, etc.

Brown colorants

Iron oxide, Amber, Permanent Brown, etc.

Red colorants

Blood red, Rose Bengal, antimony red, Permanent Red, Fire Red, Brilliant Carmine, Light Fast Red Toner, Permanent Carmine, pyrazolone red, Brodeaux, Helio Bordeaux, Rhodamine Red, Dupont Oil Red, Thioindigo Red, Thioindigo Maroon, Watching Red Strontium, etc.

Violet colorants

Cobalt Violet, Fast Violet, Dioxazine Violet, Methyl Violet Lake, etc.

Blue colorants

Methylene Blue, Aniline Blue, Cobalt Blue, cerulean blue, Chalco Oil Blue, non-metal Phthalocyanine Blue, Phthalocyanine Blue, Ultramarine Blue, Indanthrene Blue, indigo, etc.

Green colorants

Chrome Green, Cobalt Green, Pigment Green B, Green Gold, Phthalocyanine Green, Malachite Green Oxarate, Polychrome Brome Copper Phthalocyanine, etc.

It is possible to use magnetic powders such as titanium oxide, zinc oxide, etc.

Among these colorants, carbon black is preferable.

As the carbon black, the following ones are available commercially:

Carbon black #30, #32, #33, #40, #44, #45, #50, #52, #55, #600, MCF-88, MA-100, MA-600, MA-11, and MA-8 (mfd. by Mitsubishi Kasei Corp.) RAVEN 11, 15, 30, 35, 40, 50, 150, 410, 420, 430, 450, 500, 825, 850, 890H, 890, 1000, 1020, 1030, 1035, 1040, 1085, 1170, 1200, 1250, 1255, 1500, 1800, 2000, 2100, 3500, 5250, 5750, 7000, 8000 and 8800, NEO SPECTRA MARK I, MARK II, MARK IV, AG and TA, STATEX F-12 and B-12, MOLACCO H and LS, CONDUCTEX SC, 950, 975 BEADS (mfd. by Colombian Carbon Co.), MONARCH 700, 800, 880, 900, 1000, 1100 and 1300, MOGUL L, REGAL 400R, 660R, 500R, 330R, 300R, 99R 660, 500, 400, 330, 300 300I, 99I and 99, BLACK PEARLS 700, 800, 880, 900, 1000, 1100, 1300L and 2000, VULCAN XC-72R and X-72, ELFTEX 8, and 12, STERLING R (mfd. by Cabot Corp.), etc.

The colorant (B) is used in the dry toner composition in an amount of preferably 2 to 15% by weight, more preferably 4 to 12% by weight, most preferably 6 to 12% by weight. When the amount is less than 2% by weight, there readily takes place a change in printed letter density due to insufficient coloring power and unstable electric charge. On the other hand, when the amount is more than 15% by weight, adhesive strength to the toner image support becomes insufficient and flying (or scattering) of toners readily takes place due to too less electric charging amount.

When carbon black is used as the colorant (B), it is preferable to use that having an oil absorption of 150 ml/100 g or more, a volatile content of 3.0% by weight or less and a surface area of 240 $m^2/g$ or more, more preferably an oil absorption of 160 ml/100 g or more, a volatile content of 2.0% by weight or less, and a surface area of 250 $m^2/g$ or more.

The oil absorption can be determined by adding dibutyl phthalate dropwise to 100 g of carbon black while kneading the whole with a spatula, repeating the dropwise addition and the kneading until the whole becomes solid putty-like state, and measuring the amount of the dibutyl phthalate used.

The volatile content can be determined by heating carbon black at about 950° C. and measuring the weight loss.

The surface area can be measured by the Braunauer-Emmett-Teller method (BET method) using adsorption of nitrogen.

When carbon black not satisfying the above-mentioned conditions is used in the present invention, there is a tendency to lower stability of electric charge and to bring about flying of toners and change in printed letter density Preferable examples of commercially available carbon black satisfying the above-mentioned conditions are BLACK PEARLS 2000, VULCAN XC-72R, VULCAN XC-72 (mfd by Cabot Corp.), CONDUCTEX 950 BEADS, CONDUCTEX 975 BEADS (mfd. by Colombian Carbon Co.), etc.

As the charge control agent (C), there is used a mixture of a metal complex of oxycarboxylic acid (C-1) represent by the formula (I) and a metal complex of azo compound(s) represented by the formula (II) and/or (III), the weight ratio of (C-1)/(C-2) being 1/9 to 9/1, preferably 1/9 to 8/2, more preferably 1/7 to 7/3, and a total weight of (C-1) and (C-2) being 0.5 to 5% by weight, preferably 1 to 3% by weight,

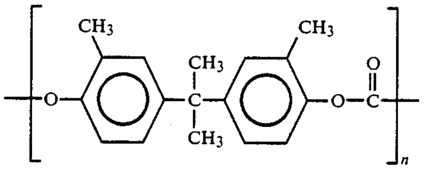

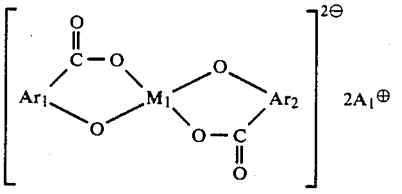

(I)

wherein $Ar_1$ and $Ar_2$ are independently a residue of an aromatic oxycarboxylic acid or a derivative thereof; $M_1$ is a chromium or zinc atom; $A_1^{\oplus}$ is a hydrogen ion, a sodium ion, a potassium ion or an ammonium ion.

(II)

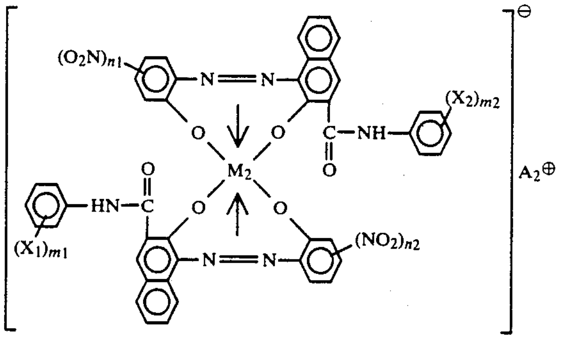

wherein $X_1$ and $X_2$ are independently hydrogen, an alkyl group having 1 to 4 carbon atoms, an alkoxy group having 1 to 4 carbon atoms, a nitro group, or a halogen atom; $m_1$ and $m_2$ are independently an integer of 1 to 3; $n_1$ and $n_2$ are independently an integer of 1 or 2; $M_2$ is a chromium or zinc atom; and $A_2^{\oplus}$ is a hydrogen ion, a sodium ion, a potassium ion, or an ammonium ion.

(III)

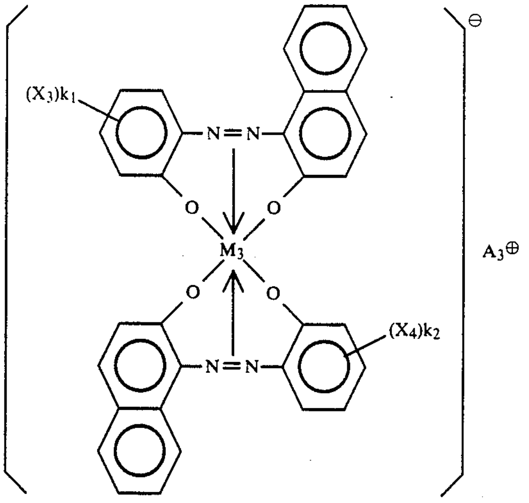

wherein $X_3$ and $X_4$ are independently $-NO_2$, $-CH_3$, $-SO_3H$, $-Cl$ or $-SO$ $k_1$ and $k_2$ are independently an integer of 1 or 2; $M_3$ is a chromium or zinc atom; and $A_3^+$ is a hydrogen ion, a sodium ion, a potassium ion, or an ammonium ion.

When the weight ratio (C-1)/(C-2) is less than 1/9, there take place lowering in electric charging amount after repeated use for a long period of time, resulting in generation of toner flying, contamination of inside and outside of a printer and a copying machine, and a so-called fogging phenomenon wherein toners adhere to back portions of printed letters. On the other hand, when the weight ratio (C-1)/(C-2) is more than 9/1, the electric charging amount increases with the number of repeated use, resulting in lowering in printed letter density.

Further, when the total amount of (C-1) and (C-2) is less than 0.5% by weight based on the weight of the toner composition, rising properties of charging amount become poor and fogging takes place due to a small electric charging amount of toner supplemented. On the other hand, when the total amount of (C-1) and (C-2) is more than 5% by weight based on the weight of the toner composition, there take place problems is that the printed letter density is low due to high electric charging amount from the initial stage, transferring properties from a photoreceptor to a toner support (paper in many cases) are poor, and cleaning properties of the photoreceptor are poor.

The compounds of the formulae (I), (II) and (III) are known ones which can be produced by conventional processes and available commercially.

Concrete examples of the compound of the formula (I) are zinc complex of 3,5-di-tert-butyl salicylate, zinc complex of 2-hydroxy-3-naphthoic acid, zinc complex of tert-butyl-2-hydroxy-3-naphthoic acid, chromium complex of 3,5-di-tert-butyl salicylate, chromium complex of 2-hydroxy-3-naphthoic acid, tert-butyl chromium complex of 2-hydroxy-3-naphthoic acid, etc. (these having an ion of hydrogen, sodium, potassium or ammonium). Further, in the formulae (I), $Ar_1$ and $Ar_2$ may be the same or different.

Concrete examples of the compound of the formula (II) are those having the groups of the formulae:

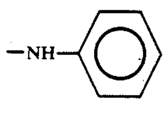, 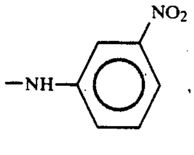, 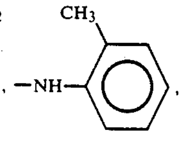,

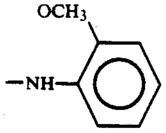, 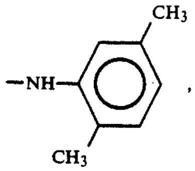,

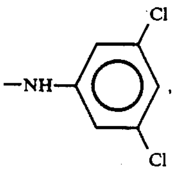, and 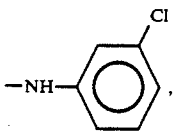, as the groups of the formulae:

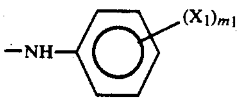 and 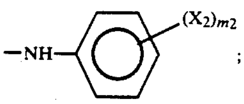 ;

$n_1$ and $n_2$ are independently 1 or 2; and $M_2$ is a chromium or zinc atom (these having an ion of hydrogen, sodium, potassium or ammonium). In the formula (II), $X_1$ and $X_2$, $m_1$ and $m_2$, and $n_1$ and $n_2$ may be the same or different, respectively.

Concrete examples of the compound of the formula (III) are those having $—NO_2$, $—CH_3$, $—SO_3H$, —Cl and $—SO_2NH_2$ groups as $X_3$ and $X_4$; $k_1$ and $k_2$ are 1 or 2, respectively (that is, the number of the substituents $X_3$ and $X_4$ is 1 or 2, respectively); and $M_3$ is Cr or Zn (these having an ion of hydrogen, sodium, potassium or ammonium). In the formula (III), $X_3$ and $X_4$, two $X_3$'s, two $X_4$'s, $k_1$ and $k_2$ may be the same or different, respectively. Further, $X_3$ and $X_4$ can be bonded to any positions of 2 to 5 positions of a benzene ring.

As the charge control agent (C-2), there can be used either a compound of the formula (II) or (III), or a mixture of compounds of the formulae (II) and (III).

When the photoreceptor contains an organic photoconductive substance, the use of a combination of zinc complex as the compound of the formula (I) and chromium complex(es) as the compounds of the formulae (II) and/or (III) is particularly preferable from the viewpoint of printed letter quality.

The dry toner composition (toner matrix) may contain one or more other known charge control agents in addition to the component (C). Examples of such charge control agents are nigrosine dyes, fatty acid-modified nigrosine dyes, carboxyl group-containing fatty acid-modified nigrosine dyes, quaternary ammonium salts, amine series compounds, organic metal compounds, chlorinated paraffins, silica powder, etc.

The dry toner composition of the present invention can contain one or more additives (D) depending on purposes.

Examples of the additives (D) are polymers of olefin monomers such as ethylene, propylene, butene, pentene, hexene, heptene, octene, nonene, decene, 3-methyl-1-butene, 3-methyl-2-pentene, 3-propyl-5-methyl-2-hexene, etc.; copolymers of these monomers mentioned above and acrylic acid, methacrylic acid, vinyl acetate, or the like; polyhydric alcohol esters of fatty acids such as Kastar Wax A (mfd. by Itoh Oil MFG Co., Ltd.), Diamond Wix (mfd. by Shin-nippon Rika Co., Ltd.); higher alcohol esters of fatty acids such as Palm Aceti (mfd. by Nippon Oil and Fats Co., Ltd.), Hoechst Wax E, Hoechst Wax OP (mfd. by Farbwerke Hoechst AG.), carnauba wax, etc.; alkelene-bisfatty acid amide compounds such as Bisamide Blast Flow (mfd. by Nitto Chemical Industry Co., Ltd.), Amide 6L, 7S and 6H (Kawaken Fine Chemical Co., Ltd.), Hoechst Wax C (mfd. by Farbwerke Hoechst AG); metal salts of fatty acids such as zinc stearate, calcium stearate, magnesium stearate, barium stearate, copper stearate, aluminum stearate, zinc oleate, magnesium oleate, zinc caprylate, magnesium caprylate, zinc linoleate, calcium linoleate; diene series resins having weight-average molecular weight of 50000 or more such as Nippol NBR, 2057S, 2007J, BR1220 (mfd. by the Japanese Geon Co., Ltd.); hydroxyl group-containing vinyl resins, carboxyl group-containing vinyl resins, etc.

These additives (D) function for reducing adhesive strength of toner images to heat rolls in the case of using a heat roll fixing method as the toner image fixing method, and for preventing the photoreceptor from damages by blades in the case of using a blade method as the cleaning method.

It is preferable to add the additive (D) in an amount of preferably 30% by weight or less, more preferably 0.1 to 20% by weight, most preferably 1 to 10% by weight, based on the weight of the dry toner composition.

The above-mentioned binder resin (A), colorant (B), charge control agent (C) including (C-1) and (C-2), and if necessary other additives (D) are subjected to a homogenizing step to produce the dry toner composition (toner matrix).

The above-mentioned raw materials are mixed as follows. After preliminary mixing, the weighed raw materials with a W cone, a V blender, a Henschel mixer or the like, kneading is carried out using a pressed kneader, a Banbury mixer, a heat roll, an extruder or the like at a temperature of melting the resin. After cooling, pulverizing is carried out using a feather mill, a pin mill, pulverizer, a hammer mill, or the like. Then, classification is carried out using a Acucut classifier, Alpine classifier, on the like to select the particle size of preferably 5 to 30 μm, more preferably 8 to 15 μm.

The resulting dry toner composition (toner matrix) can be used as it is. In order to obtain a toner composition showing excellent properties for a long period of time, it is preferable to mix with a silica powder, a magnetic powder, and if necessary, a metal salt of fatty acid or the like.

More concretely, it is preferable that the dry toner composition is mixed with 0.1 to 1% by weight, more preferably 0.2 to 0.8% by weight, of silica powder and 0.05 to 2% by weight, more preferably 0.5 to 1.5% by weight, of a magnetic powder, if necessary 1% by weight or less of other modifier, based on the weight of the dry toner composition, in order to show further good properties such as no toner flying, high image density and high fluidity.

It is still further preferable that the dry toner composition is further mixed with 0.1 to 1% by weight, more preferably 0.2 to 0.8% by weight, of silica powder, 0.05 to 2% by weight, more preferably 0.5 to 2% by weight, most preferably 0.5 to 1.5% by weight of magnetic powder, 0.01 to 0.5% by weight, more preferably 0.02 to 0.2% by weight, of a metal salt of fatty acid, and if necessary 1% by weight or less of other modifier, based on the weight of the dry toner composition, in order to provide still further better properties with no toner flying, high image density and high fluidity as well as excellent protection for the photoreceptor.

When the silica powder is mixed in the above range, the fluidity, electric charging properties and fixing properties become better. Further, when the magnetic powder is mixed in the above range, the electric charging properties become better and the toner flying and fogging hardly take place. In addition, when the metal salt of fatty acid is mixed in the above range, the printing troubles do not take place, the life of photoreceptor and developer is improved, and the fluidity becomes better.

As the silica powder, hydrophobic silica powder is most suitable. Such a hydrophobic silica powder can be obtained by reacting fine powder of silicon dioxide wherein the surface silicon atom is in the form of a silanol group with a compound having a hydrophobic group so as to bond the hydrophobic group to the surface silicon atom via oxygen atom.

Examples of the compound having a hydrophobic group are octyltrichlorosilane, decyltrichlorosilane, nonyltrichlorosilane, 4-isopropylphenyltrichlorosilane, 4-tert-butylphenyltrichlorosilane, dimethyldichlorosilane, dipentyldichlorosilane, dihexyldichlorosilane, dioctyldichlorosilane, dinonyldichlorosilane, didecyldichlorosilane, didodecyldichlorosilane, 4-tert-butylphenyloctyldichlorosilane, dioctyldichlorosilane, didecenyldichlorosilane, dinonenyldichlorosilane, di-2-ethylhexyldichlorosilane, di-3,3-dimethylpentyldichlorosilane, trimethylchlorosilane, trihexylchlorosilane, trioctylchlorosilane, tridecylchlorosilane, dioctylchlorosilane, octyldimethylchlorosilane, 4-isopropylphenyldiethylchlorosilane, etc.

It is preferable that the silica powder has an average particle size of primary particles of 30 mμ or less from the viewpoint of protecting the photoreceptor.

The hydrophobic silica powder is available commercially in the names of Aerosil R972, Silica D-17, T-805, R812, RA 200H, RX-C (mfd. by Nippon Aerosil Co., Ltd.), and Tullanox 500 (Tulco Inc.), Cab-O-SiL. M-5, MS-7, MS-75, HS-5, EH-5, S-17, TS-720 (mfd. by Cabot Corp.), etc.

As the magnetic powder, there can be used powders of metals such as iron, manganese, nickel, cobalt, etc.; ferrites such as magnetite, copper-zinc ferrite, barium-nickel ferrite, nickel-zinc ferrite, manganese-zinc ferrite, lithium-zinc ferrite, magnesium-manganese ferrite, magnesium-copper-zinc ferrite, barium-nickel-zinc ferrite, barium-copper-zinc ferrite, etc. Among them, magnetite is preferable.

It is preferable that the magnetic powder has an average particle size of 0.8 μm or less. When the average particle size is more than 0.8 μm, the photoreceptor is easily damaged to lower printing properties, image density and to cause toner flying.

In order to improve dispersing properties, adhesion to the toner matrix and printed letter and image quality, it is preferable to coat the surface of magnetic powder with a long chain aliphatic compound such as stearic acid, oleic acid, palmitic acid, caproic acid, linoleic acid, ricinolic acid, etc.; an aliphatic dicarboxylic acid having 10 to 22 carbon atoms; hydroxyl-containing compounds of these compounds mentioned above, or a salt of one of the above-mentioned compounds with zinc, magnesium, calcium, cadmium, lead, iron, nickel, cobalt, copper, aluminum, or the like.

The magnetic powder preferably has magnetization intensity of 64±4 emu/g at 1K oersted of external magnetic field strength in order to prevent toner flying and to difficultly remain in the developing device.

As the metal salt of fatty acid, there can be used metal salts of saturated or unsaturated fatty acids such as maleic acid, stearic acid, oleic acid, palmitic acid, caproic acid, linoleic acid, ricinolic acid, etc. As the metal, there can be used zinc, magnesium, calcium, cadmium, lead, iron, nickel, cobalt, copper or aluminum. Among them, preferred ones are zinc stearate, calcium stearate, magnesium stearate, or aluminum stearate. Further, zinc stearate is particularly preferable.

It is possible to add one or more other modifiers, if necessary, to the dry toner composition. Examples of such modifiers are aluminum oxide, zinc oxide, titanium oxide, magnesium oxide, calcium carbonate, poly(methyl methacrylate), etc. These can be used alone or as a mixture thereof.

The modifier functions for accelerating charging properties of toners, enhancing quality of printed letters and images (density, fogging resolution, gradation, etc.), controlling resistance, lowering a friction coefficient with the photoreceptor, and for removing the toner component or the added component in the image support attached to the photoreceptor.

By mixing the silica powder, the magnetic powder, the metal salt of fatty acid, and other modifiers with the dry toner composition in the predetermined amounts mentioned above, there can be provided excellent properties such as prevention of toner flying and fogging, high printed letter density, high printed letter quality and durability for repeated use for a long period of time.

The mixing of the toner matrix with the silica powder, magnetic powder, metal salt of fatty acid and other modifier can be carried out using a V type mixer, Henschel mixer, Turbura mixer, Hybridizer, or the like.

By combining the dry toner composition with a carrier, the dry developer of the present invention can be obtained.

As the carrier, there can be used iron oxide powder; particles of ferrites such as manganese, cobalt, nickel, zinc, tin, magnesium, lead, strontium, barium, lithium, etc.; iron oxide powder and ferrite particles surface coated with tetrafluoroethylene resin, acrylic resin, polyester resin, silicone resin, melamine resin, butadiene resin, butyral resin, etc.; and particles of kneaded mixtures with various resins.

As the ferrite, there can be used copper-zinc ferrite, barium-zinc ferrite, barium-nickel ferrite, nickel-zinc ferrite, manganese-zinc ferrite, lithium-zinc ferrite, magnesium-manganese ferrite, magnesium-copper-zinc ferrite, barium-nickel-zinc ferrite, barium-copper-zinc ferrite, etc. Among them, the use of copper-zinc ferrite is particularly preferable. When said ferrite is covered with an acrylic resin to give a carrier, there can be obtained long life even if used repeatedly and excellent resistance to circumstances.

The developer of the present invention can be produced by mixing the toner (composition) mentioned above with the carrier. The content of the toner (composition) is usually 1 to 10% by weight, preferably 1 to 6% by weight, based on the total amounts of the toner and the carrier. When the content of toner is less than 1% by weight, the density of printed letter and image becomes small, and a so-called carrier sticking (carrier being sticked to photoconductive body) easily takes place. On the other hand, when the content of toner is more than 10% by weight, contamination of inside and outside of printer and back portions of printed letters due to toner flying becomes prominent.

The dry toner composition and the dry developer of the present invention can be used in various known developing methods, particularly in an image forming method combined with a photoreceptor containing an organic photoconductor substance.

As the photoreceptor, it is preferable to use a function separation type having a charge generating layer and a charge transport layer excellent in sensitivity.

As the organic photoconductive substance generating charge and contained in the charge generating layer, there can be used pigments of azoxybenzene series, disazo series, triazo series, benzimidazole series, polycyclic quinoline series, indigoid series, quinacridone series, phthalocyanine series, perylene series, methine series, etc. Among them, phthalocyanine pigments are particularly preferable.

As the organic photoconductive substance transporting charge and contained in the charge transport layer, there can be used oxazole derivatives, hydrozone derivatives, enamine derivatives, etc.

As the binder resin for fixing the organic photoconductive substance to the support, there can be used polycarbonate resins, esterified polycarbonate resins, silicone resins, styrene resins, styrene-acrylic resins, polyamide resins, polyester resins, polyvinyl butyrals, etc.

For example, a photoreceptor comprising a charge generating layer containing titanyl phthalocyanine and a charge transport layer containing 1,1-diphenylhydrazino-3-methylidene-N-methylcarbazole of the formula:

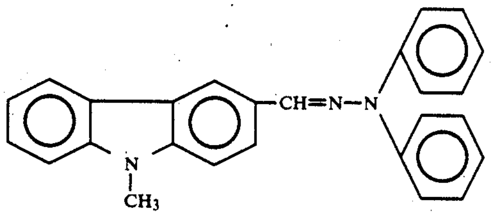

and 1,1-diphenyl-3-[2',2'-(di-4''-methoxyphenyl)]vinyl hydrozone of the formula:

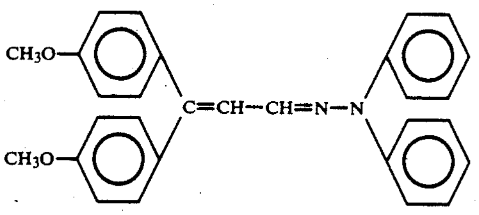

is particularly excellent in sensitivity, light response and dark decay. Thus, this is most suitable for the process of the present invention for forming images with high speed.

In the process for forming images according to the present invention, images can be obtained by making a latent static image formed on the photoreceptor visible using the developer of the present invention, transferring the image to a support such as paper, and fixing the image. For example, in the case of using a high speed printer, the developer of the present invention is set in the printer, the photoreceptor is negatively charged by corona voltage, and information is written by a semiconductor laser to form a latent static image. Then, a toner is attached to the latent static image to be developed. The developed information is transferred to a support such as paper, followed by fixing using, e.g. a heat roll.

The dry toner composition and the dry developer of the present application can be applied to various fixing methods such as a so-called oilless and oil-coated heat roll method, a flash method, an oven method, a pressing fixing method, and the like. Among them, the heat roll fixing method is preferable.

Further, the dry toner composition and the dry developer of the present invention can be used in various cleaning methods such as a so-called fur blushing method, a blade method, or the like.

When the dry toner composition and the dry developer of the present invention are used in image forming methods using a high speed continuous paper (or serial) printer wherein the peripheral speed of a photoreceptor is 25 cm/sec or more, particularly 50 cm/sec or more, or a high speed cut sheet printer wherein the peripheral speed of photoreceptor is 25 cm/sec or more and printing speed is 60 sheets/min or more, there can be obtained particularly excellent images.

The present invention is illustrated by way of the following Examples, in which all parts and percents are by weight unless otherwise specified.

EXAMPLES 1 TO 7, COMPARATIVE EXAMPLES 1 AND 2

(1) Production of Copolymer R-1

In a reactor containing 2000 parts of aqueous dispersing medium dissolving 3 parts of partially saponified polyvinyl alcohol (Denka Poval W-24, mfd. by Denki Kagaku Kogyo K.K.), 1000 parts of monomers and a polymerization initiator shown in Table 1 were placed and reacted at 80° to 90° C. for 10 hours in a nitrogen stream. A copolymer was obtained by filtration and drying with hot air.

(2) Production of Copolymers R-2 to R-4

To 1000 parts of xylene, 1000 parts of monomer shown in Table 2 and 3% of azobisisobutyronitrile based on the weight of the monomer, 7% of 2-ethylhexyl peroxybenzoate was added and the reaction was carried out at 135° C. for 8 hours. After removing the xylene by distillation in a vacuum dryer heated at 160° C., resins L-1 and L-2 were obtained. Then, a mixture of monomers, a resin and a polymerization initiator as shown in Table 1 was prepared in the same manner as described in above (1) to obtain each copolymer.

TABLE 1

| | | (Unit: parts) | | | |
|---|---|---|---|---|---|
| Copolymer | | R-1 | R-2 | R-3 | R-4 |
| Monomer | Styrene | 600 | 462 | 500 | 663 |

TABLE 1-continued

| | Copolymer | (Unit: parts) R-1 | R-2 | R-3 | R-4 |
|---|---|---|---|---|---|
| | Butyl methacrylate | 400 | — | — | — |
| | Methyl methacrylate | — | — | — | — |
| | Butyl acrylate | — | 138 | 150 | 187 |
| Initiator | Benzoyl peroxide | 20 | — | — | — |
| | 1,1-Bis(t-butylperoxy)-3,3,5-trimethylcyclohexane | — | 10 | 10 | 15 |
| Resin | L-1 | — | 400 | — | — |
| | L-2 | — | — | 350 | 150 |
| Properties | Glass transition temp. (°C.)*1 | 70 | 68 | 66 | 68 |
| | Weight-average molecular weight*2 | 70,000 | 120,000 | 150,000 | 70,000 |
| | Number-average molecular weight*2 | 30,000 | 7,000 | 6,000 | 4,000 |
| | Contents of monomer and solvent (%) | 0.02 | 0.02 | 0.02 | 0.02 |

Note
*1Thermomechanical analysis method; penetration mode, load 70 g.
*2Gel permeation chromatographic method; converted to standard polystyrene using a calibration curve.

TABLE 2

| Resin | L-1 | L-2 |
|---|---|---|
| Styrene | 800 | 800 |
| Butyl acrylate | 200 | 50 |
| Methyl methacrylate | — | 150 |

(3) Production of Toner

After preliminary mixing raw materials shown in Table 3 in a Henschel mixer, the contents were melt kneaded in a kneader. Then, cooled mixture was pulverized finely in a pin mill and a jet mill, followed by classification to give a toner having an average particle size of 10 to 15 μm.

TABLE 3

| | | Example 1 | 2 | 3 | 4 | 5 | 6 | 7 | (Unit: %) Comparative Example 1 | 2 |
|---|---|---|---|---|---|---|---|---|---|---|
| Binder resin | Copolymer R-1 | 83 | | | | | 50 | | 83 | 86 |
| | Copolymer R-2 | | 84.5 | | | | | | | |
| | Copolymer R-3 | | | 86 | | 87.5 | | 83 | | |
| | Copolymer R-4 | | | | 88 | | 35.5 | | | |
| | Polyester resin FC-035*1 | 5 | | | | | 3 | 1 | 5 | |
| | EVAFLEX 310*2 | | 5 | | | | | 3 | | |
| Charge control agent | Formula (I) ① ... Compound*3 | 0.1 | 1 | 0.5 | | | 0.2 | | 1 | |
| | Formula (I) ② ... Compound*4 | | | | 0.5 | 1 | | 1.8 | | |
| | Formula (II) ① ... Compound*5 | 0.9 | 0.5 | 1.5 | | | 0.2 | 0.1 | | 2 |
| | Formula (II) ② ... Compound*6 | | | | 2.5 | 1.5 | 0.1 | 0.1 | | |
| Colorant | Carbon black #40*7 | 10 | 8 | 10 | 7 | 8 | 10 | 10 | 10 | 10 |
| Additive | Viscol 660P*8 | 1 | 1 | 2 | 2 | 2 | 1 | 1 | 1 | 2 |

Note on Table 3:
*1FC-035: mfd. by Mitsubishi Rayon Co., Ltd.
*2EVA FLEX 310: ethylene-vinyl acetate copolymer (mfd. by Mitsui Polychemical Co., Ltd.)
*3Formula (I) - ①

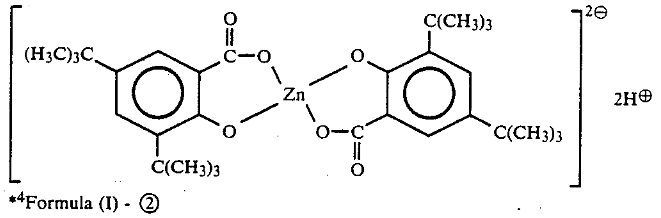

*4Formula (I) - ②

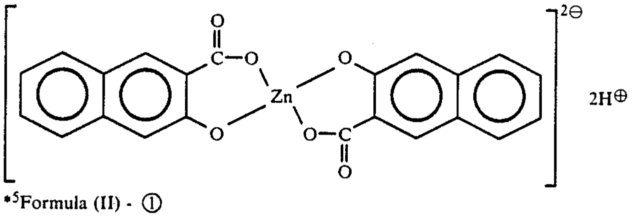

*5Formula (II) - ①

TABLE 3-continued

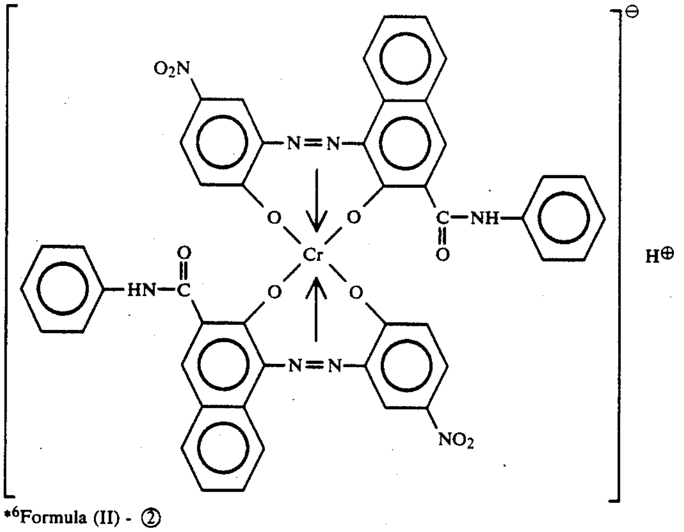

*6Formula (II) - ②

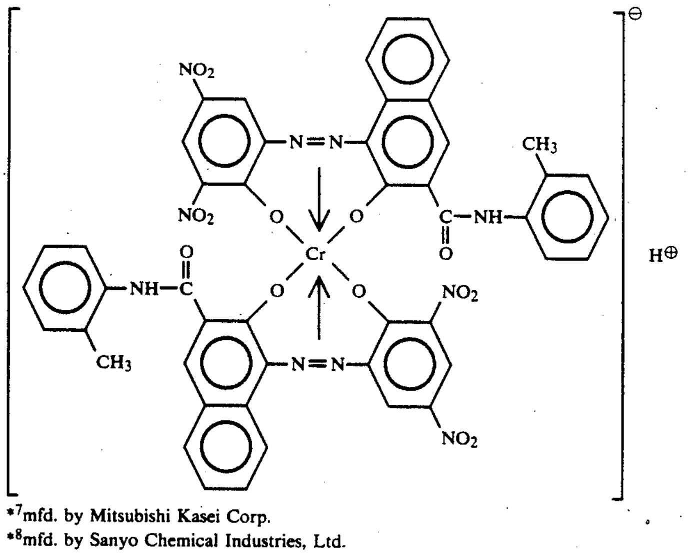

*7mfd. by Mitsubishi Kasei Corp.
*8mfd. by Sanyo Chemical Industries, Ltd.

(4) Evaluation

A developer was prepared by mixing 4% of a toner shown in Table 3 and 96% of copper-zinc ferrite carrier having an apparent density of 2.5 to 3.0 g/$cm^3$, electric resistance value of $10^8$ to $10^9$ Ωcm and a particle size of 44 to 105 μm in an amount of 90% or more. After negatively charging an organic photoconductive photoreceptor by corona discharge, information was written with a semiconductor laser, and printing was repeated using a high speed serial printer wherein the peripheral speed of photoreceptor reverse developed by a magnetic brushing method using the developer mentioned above was about 30 cm/sec.

The results are shown in Table 4.

(1) Charging amount

Electric charging amount per gram of toner was measured by using a blow off charging amount measuring apparatus mfd. by Toshiba Chemical Co.

(2) Printed letter density and fogging density

Printed letter density and fogging density were measured on printed matters using a Micro Photometer MPM type (mfd. by Union Optical Co., Ltd.) at an initial stage and after printing 300,000 sheets of paper.

(3) Toner flying

Toner flying on printed matters after printing 300,000 sheets of paper was judged by the naked eye.

EXAMPLE 8

To 100 parts of toner composition obtained in Example 1, 0.3 part of hydrophobic silica powder R-792 (mfd. by Nippon Aerosil Co., Ltd.) was added and subjected to fixing treatment using a Henschel mixer. A developer was prepared and evaluated in the same manner as described in Example 1.

TABLE 4

| | | Example | | | | | | | | Comparative Example | |
|---|---|---|---|---|---|---|---|---|---|---|---|
| | | 1 | 2 | 3 | 4 | 5 | 6 | 7 | 8 | 1 | 2 |
| Initial stage | Charging amount (μC/g) | 17 | 20 | 22 | 25 | 23 | 14 | 23 | 20 | 25 | 20 |
| | Printed letter density | 1.4 | 1.4 | 1.4 | 1.3 | 1.4 | 1.5 | 1.4 | 1.4 | 1.4 | 1.4 |
| | Fogging density | 0.08 | 0.08 | 0.08 | 0.08 | 0.08 | 0.08 | 0.08 | 0.08 | 0.08 | 0.08 |
| After printing 300,000 sheets of paper | Charging amount (μC/g) | 20 | 21 | 24 | 27 | 20 | 18 | 30 | 22 | 45 | 10 |
| | Printed letter density | 1.3 | 1.4 | 1.3 | 1.3 | 1.4 | 1.3 | 1.2 | 1.3 | 0.4 | 0.6 |
| | Fogging density | 0.08 | 0.08 | 0.08 | 0.08 | 0.08 | 0.10 | 0.08 | 0.08 | 0.08 | 0.15 |
| | Toner flying | None | None | None | None | None | Slight | None | None | None | Yes |

EXAMPLES 9 TO 17, COMPARATIVE EXAMPLES 3 TO 5

After preliminary mixing raw materials shown in Table 5 using a Henschel mixer, the resulting mixture was melt kneaded in a kneader. After cooling, the mixture was pulverized finely using a pin mill and a jet mill, followed by classification to give a toner having an average particle size of 10 to 15 μm.

TABLE 5

| | | (Unit: %) | | | | | | | | | | | |
|---|---|---|---|---|---|---|---|---|---|---|---|---|---|
| | | Example | | | | | | | | | Comparative Example | | |
| | | 9 | 10 | 11 | 12 | 13 | 14 | 15 | 16 | 17 | 3 | 4 | 5 |
| Binder resin | Copolymer R-1 | 90 | | | | | 18 | | | | 87 | 86 | |
| | Copolymer R-2 | | 87 | | 86 | | 20 | | | | | | |
| | Copolymer R-3 | | | 85.5 | | 88.5 | 48.5 | | | | | | |
| | Polyester resin FC-042*1 | | | | | | | 84.5 | | | | | |
| | Polyester resin HTR-1*2 | | | | | | | | 87.4 | | | | 82.7 |
| | Polyester resin HTR-2*2 | | | | | | | | | 82.4 | | | |
| Negative charge control agent | Formula (I) ①... Compound | 0.2 | | 0.3 | 0.6 | 0.35 | 0.1 | 0.5 | | 0.3 | 1 | | 0.1 |
| | ②... Compound | | 0.5 | | | | 0.2 | | 0.8 | 0.3 | | | |
| | Formula (II) ①... Compound | 1.8 | | 1.2 | | 0.15 | 0.4 | 1.0 | | 1.0 | | 2 | 0.2 |
| | ②... Compound | | 0.5 | | 1.4 | | 0.8 | | 0.8 | | | | |
| Colorant | Black Pearls 2000*3 | 6 | | | 2 | | 1 | 13 | | | | | |
| | Vulcan XC-72*3 | | 10 | | 8 | | 5 | | 10 | | | 10 | |
| | Conductex 975 Beads*4 | | | 11 | | 9 | 4 | | | 15 | 10 | | 15 |
| Additive | Viscol 550P*5 | 2 | 2 | 2 | 2 | 2 | 2 | 1 | 1 | 1 | 2 | 2 | 2 |

Note
*1mfd. by Mitsubishi Rayon Co., Ltd.
*2mfd. by Kao Corp.
*3mfd. by Cabot Corp.
*4mfd. by Columbian Carbon Co.
*5mfd. by Sanyo Chemical Industries, Ltd.

A developer was prepared by mixing 3% of toner composition shown in Table 5 and 97% of a ferrite carrier having an apparent density of 2.5 to 3.0 g/cm$^3$, electric resistance value of $10^8$ to $10^9$Ωcm, and a particle size of 44 to 105 μm in an amount of 90% or more. After negatively charging an organic photoconductive photoreceptor using phthalocyanine in a charge generating layer by corona discharge, information was written with a semiconductor laser, and printing was repeated using a cut sheet printer wherein the peripheral speed of photoreceptor reverse developed by a magnetic brushing method using the developer mentioned above was about 25 cm/sec, and printing speed of 60 sheets/min.

The results are shown in Table 6.

(1) Charging amount

See Example 1.

(b 2) Printed letter density and fogging density

See Example 1.

(3) Disorder of image

Judged by the naked eye.

(4) Frequency of jam generation

Number of jam in the transferring portion was counted and expressed as the number of generation per ten thousands of sheets of paper.

Properties of the colorants used in the Examples are shown in Table 7.

TABLE 6

| | | Example | | | | | | | | | Comparative Example | | |
|---|---|---|---|---|---|---|---|---|---|---|---|---|---|
| | | 9 | 10 | 11 | 12 | 13 | 14 | 15 | 16 | 17 | 3 | 4 | 5 |
| Initial stage | Charging amount (μC/g) | 25 | 23 | 24 | 24 | 22 | 24 | 25 | 27 | 25 | 25 | 23 | 23 |
| | Printed letter density | 1.3 | 1.4 | 1.4 | 1.4 | 1.4 | 1.3 | 1.4 | 1.4 | 1.4 | 1.4 | 1.3 | 1.4 |
| | Fogging density | 0.08 | 0.08 | 0.08 | 0.08 | 0.08 | 0.08 | 0.08 | 0.08 | 0.08 | 0.08 | 0.08 | 0.08 |
| After printing 500,000 sheets | Charging amount (μC/g) | 21 | 25 | 24 | 25 | 23 | 24 | 28 | 32 | 30 | 40 | 10 | 35 |
| | Printed letter density | 1.5 | 1.4 | 1.4 | 1.3 | 1.3 | 1.4 | 1.3 | 1.3 | 1.3 | 0.5 | 1.5 | 0.6 |
| | Fogging density | 0.09 | 0.08 | 0.08 | 0.08 | 0.08 | 0.08 | 0.09 | 0.09 | 0.09 | 0.08 | 0.15 | 0.09 |
| | Toner flying | No | No | No | No | No | No | No | No | No | No | Yes | Yes |

TABLE 6-continued

| | Example | | | | | | | | | Comparative Example | | |
|---|---|---|---|---|---|---|---|---|---|---|---|---|
| | 9 | 10 | 11 | 12 | 13 | 14 | 15 | 16 | 17 | 3 | 4 | 5 |
| of paper Disorder of image | No | No | No | No | No | No | No | No | No | Yes | Yes | Yes |
| Frequency of jam generation (number/10,000 sheets) | 0 | 0 | 0 | 0 | 0 | 0 | 0 | 0 | 0 | 10 | 30 | 20 |

TABLE 7

| | Oil absorption (cc/100 g) | Volatile content (weight %) | Surface area ($m^2/g$) |
|---|---|---|---|
| Black Pearls 2000 | 330 | 2.0 | 1475 |
| Vulcan XC-72 | 178 | 1.5 | 254 |
| Conductex 975 Beads | 160 | 1.0 | 270 |
| Mogul L | 60 | 5.0 | 138 |
| Carbon Black #44 | 82 | 1.0 | 125 |

EXAMPLES 18 TO 30, COMPARATIVE EXAMPLES 6 TO 11

(1) Production of Copolymers CP-1 to CP-4

Using monomers and a polymerization initiator shown in Table 8, copolymers CP-1 and CP-2 were produced in the same manner as described in Example 1 for producing the copolymer R-1. Further, using monomers and a polymerization initiator shown in Table 8, copolymers CP-3 and CP-4 were produced in the same manner as described in Example 2 for producing the copolymer R-2.

(2) Production of Toner matrix

After preliminary mixing raw materials shown in Table 9 in a Henschel mixer, the resulting mixture was melt kneaded using a biaxial kneader. After cooling, the mixture was pulverized by using a hammer mill and a jet mill to give a toner matrix having an average particle size of 10 to 13 μm.

TABLE 8

| | | (Unit: parts) | | | |
|---|---|---|---|---|---|
| | Copolymer | CP-1 | CP-2 | CP-3 | CP-4 |
| Monomer | Styrene | 590 | 400 | 690 | 460 |
| | Butyl methacrylate | 410 | | | |
| | Methyl methacrylate | | | | 50 |
| | Butyl acrylate | | | 110 | 140 |
| | Dibutyl fumarate | | 300 | 100 | |
| | 2-Phthalimidethyl methacrylate | | 300 | | |
| Resin | L-1 | | | | 100 |
| | L-2 | | | 100 | 250 |
| Initiator | Benzoyl peroxide | 20 | 35 | | |
| | 1,1-Bis(t-butyl peroxy)-3,3,5-trimethylcyclohexane | | | 10 | 15 |
| Properties | Glass transition temp. (°C.) | 69 | 68 | 70 | 72 |
| | Number-average mol. wt. | 30,000 | 25,000 | 5,000 | 6,000 |
| | Weight-average mol. wt. | 70,000 | 60,000 | 40,000 | 160,000 |
| Contents of monomer and solvent (%) | | ≦0.02 | ≦0.02 | ≦0.02 | ≦0.02 |

TABLE 9

| | | BT- | | | | | | | | | BH- | | | (Unit: %) |
|---|---|---|---|---|---|---|---|---|---|---|---|---|---|---|
| | | 1 | 2 | 3 | 4 | 5 | 6 | 7 | 8 | 9 | 1 | 2 | 3 | 4 |
| Binder resin | Copolymer CP-1 | 87 | | | | | | | | 26 | 86 | 86 | 87.8 | 81 |
| | Copolymer CP-2 | | 87 | | | | | | | | | | | |
| | Copolymer CP-3 | | | 87 | | | | | 87 | | | | | |
| | Copolymer CP-4 | | | | 85 | | | 85 | | 60 | | | | |
| | HTR-1*[1] | | | | | 78 | | | | | | | | |
| | FC-042*[2] | | | | | | 80 | | | | | | | |
| Charge control agent | Formula (I) ③ . . . Compound*[3] | 0.1 | | 0.9 | 0.3 | | | 2.1 | | 0.7 | 2 | | 0.1 | 4 |
| | Formula (I) ② . . . Compound | | 0.5 | | | 0.5 | 2.5 | | 2.7 | 0.7 | | | | |
| | Formula (II) ① . . . Compound | 0.9 | | 0.1 | 2.7 | | 2.5 | 0.9 | | 0.3 | | 2 | 0.1 | 3 |
| | Formula (II) ② . . . Compound | | 0.5 | | | 4.5 | | | 0.3 | 0.3 | | | | |
| Carbon black | Carbon black #44 | 10 | | 10 | | | 13 | 5 | | 6 | 10 | 10 | 10 | 10 |
| | Mogul L | | 10 | | 10 | 15 | | | | | | | | |
| | Vulcan XC-72 | | | | | | | 5 | 8 | 4 | | | | |
| Additive | Viscol 550P | 2 | 2 | 2 | 2 | 2 | 2 | 2 | 2 | 2 | 2 | 2 | 2 | 2 |

Note on Table 9
*[1]Polyester resin having an acid value of 22, hydroxyl value of 27 and glass transition temperature of 67° C., mfd. by Kao Corp.
*[2]Polyester resin having an acid value of 10, and glass transition temperature of 64° C., mfd. by Mitsubishi Rayon Co., Ltd.
*[3]Formula (I) - ③

TABLE 9-continued

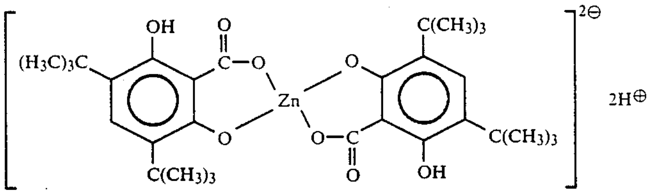

(3) Production of toner and developer

Materials shown in Table 10 were dispersed using a V type mixer to give final toners and developers.

TABLE 10

| | | | (Unit: parts) Example | | | | | | | | | | | | |
|---|---|---|---|---|---|---|---|---|---|---|---|---|---|---|---|
| | | | 18 | 19 | 20 | 21 | 22 | 23 | 24 | 25 | 26 | 27 | 28 | 29 | 30 |
| | Toner matrix | BT-1 | 100 | | | | | | | | | 100 | 100 | 100 | |
| | | BT-2 | | 100 | | | | | | | | | | | 100 |
| | | BT-3 | | | 100 | | | | | | | | | | |
| | | BT-4 | | | | 100 | | | | | | | | | |
| | | BT-5 | | | | | 100 | | | | | | | | |
| | | BT-6 | | | | | | 100 | | | | | | | |
| | | BT-7 | | | | | | | 100 | | | | | | |
| | | BT-8 | | | | | | | | 100 | | | | | |
| | | BT-9 | | | | | | | | | 100 | | | | |
| | | BH-1 | | | | | | | | | | | | | |
| | | BH-2 | | | | | | | | | | | | | |
| | | BH-3 | | | | | | | | | | | | | |
| | | BH-4 | | | | | | | | | | | | | |
| Toner | Silica powder *1 | Aerosil R-972 | 0.5 | | 0.3 | 0.7 | | 0.5 | 0.3 | 0.1 | 0.3 | | 0.3 | | |
| | | Tullanox 500 | | 0.2 | | | 0.3 | | | | | | | | 0.2 |
| | Magnetic powder *2 | MG-1 | 1.0 | | | | | 1.0 | 1.0 | 1.0 | | | | 1.0 | |
| | | MG-2 | | 1.5 | | 0.5 | 0.5 | | | | | | | | |
| | | MG-3 | | | 1.0 | 0.5 | | | | 1.0 | 1.0 | | | | |
| | | MG-4 | | | | | | | | | | | | | 1.0 |
| | Other modifier | Titanium oxide | | 0.1 | | | | | | | | | | | |
| | | Aluminum oxide | 0.5 | | | | | | | | | | | | |
| | | Zinc oxide | | | | 0.1 | | | | 0.05 | | | | | |
| | | Magnesium oxide | | | | | | 0.05 | | | | | | | |
| | | Calcium carbonate | | | | | | 0.05 | | | | | | | |
| | | Poly (methyl methacrylate) | | | | | 0.1 | | | | | | | | |
| Carrier *3 | | C-1 | | | | | | | | | | | | | |
| | | C-2 | | | | | | | | | | | | | |
| Toner concentration (%) | | | 3 | 4 | 3 | 3 | 2 | 1 | 3 | 5 | 3 | 3 | 3 | 3 | 4 |

| | | | (Unit: parts) Comparative Example | | | | | |
|---|---|---|---|---|---|---|---|---|
| | | | 6 | 7 | 8 | 9 | 10 | 11 |
| | Toner matrix | BT-1 | | | | | | |
| | | BT-2 | | | | | | |
| | | BT-3 | | | | | | |
| | | BT-4 | | | | | | |
| | | BT-5 | | | | | | |
| | | BT-6 | | | | | | |
| | | BT-7 | | | | | | |
| | | BT-8 | | | | | | |
| | | BT-9 | | | | | | |
| | | BH-1 | 100 | | | | 100 | |
| | | BH-2 | | 100 | | | | 100 |
| | | BH-3 | | | 100 | | | |
| | | BH-4 | | | | 100 | | |
| Toner | Silica powder *1 | Aerosil R-972 | | | | | 0.3 | |
| | | Tullanox 500 | | | | | | 0.7 |
| | Magnetic powder *2 | MG-1 | | | | | | |
| | | MG-2 | | | | | 1.0 | 1.0 |
| | | MG-3 | | | | | | |
| | | MG-4 | | | | | | |
| | Other modifier | Titanium oxide | | | | | | |
| | | Aluminum oxide | | | | | | |
| | | Zinc oxide | | | | | | |
| | | Magnesium oxide | | | | | | |
| | | Calcium carbonate | | | | | | |
| | | Poly (methyl methacrylate) | | | | | | |
| Carrier | | C-1 | | | | | | |

TABLE 10-continued

| | | | | | | | |
|---|---|---|---|---|---|---|---|
| *3 | C-2 | | | | | | |
| Toner concentration (%) | | 3 | 3 | 3 | 3 | 3 | 3 |

Note
*1: Aerosil R972: average particle size of primary particles: 16 mμ
Tullanox 500: average particle size of primary particles: 7 mμ
*2: MG-1, magnetite, mfd. by Mitsui Mining & Smelting Co., Ltd., average particle size about 0.6 μm, magnetization intensity 64 emu/g.
MG-2, magnetite obtained by classifying magnetite MG-WL (mfd. by Mitsui Mining & Smelting Co., Ltd.) using a jig-zag classifier mfd. by Alpine Co., average particle size about 0.8 μm, 65 emu/g.
MG-3, surface treated magnetite obtained by mixing 99% of MG-1 and 1% of zinc stearate using a V type blender, mag. intensity 63 emu/g.
MG-4, magnetite obtained by classifying magnetite MG-WLL (mfd. by Mitsui Mining & Smelting Co., Ltd.) using a jig-zag classifier mfd. by Alpine Co., average particle size 1.5 μm, magnetization intensity 61 emu/g.
*3: C-1, copper-zinc ferrite carrier having the following particle size distribution: 74–105 μm: about 50% 63–74 μm: about 20% 44–63 μm: about 30% magnetization intensity 64 emu/g.
C-2, carrier obtained by surface coating C-1 carrier with acrylic resin containing hydroxyl groups - melamine resin, mag. intensity 64 emu/g. Used carrier was marked with O.

The magnetization intensity was the value under an external magnetic field of 1 K oersted.

(4) Evaluation

After negatively charging organic photoconductive body using phthalocyanine in the charge generating layer at about −700 V by corona voltage, information was written by semiconductor laser, and printing was conducted using a cut sheet printer wherein the peripheral speed of photoreceptor reverse developed by a magnetic brushing method was about 70 cm/sec, development gap 1.7 mm, and bias voltage −400 V.

The results are shown in Table 11.

Properties were measured as follows.

(1) Image density and fogging density

Printed image density was measured by using a Micro Photometer MPM type (mfd. by Union Optical Co., Ltd.). Fogging density of image back portions was measured by using a reflectance meter Model TC-6DS (mfd. by Tokyo Denshoku Co., Ltd.) in comparison with a difference in unprinted paper.

(2) Resolution

Printed image was magnified by 10 times and resolution was evaluated by the number of lines per inch.

(3) Toner flying

Toner filed from a developing device was observed by the naked eye. Flying was evaluated by 5 grades: (5)much, (4)middle, (3)small, (2)trace, and (1)none.

(4) Photoreceptor properties

Surface appearance was judged by the naked eye. Light response and sensitivity were measured by using Cynthia-30HC (mfd. by Gentec Co., Ltd.).

(a) Conditions for measuring light response

An organic photoconductive body after printing 700,000 sheets of paper was set in Cynthia-30HC, and the surface voltage $V_0$ of −700 V was charged by corona voltage. Then, it was irradiated by a halogen lamp with light exposure intensity of 20 mJ/m$^2$ for 50 msec. The surface voltage $V_R$ after 0.2 second from the beginning of irradiation was measured. The property $V_R$ of non-used one was 100 V.

(b) Conditions for measuring sensitivity

An organic photoconductive body charged at $V_0$ of −700 V and after printing 700,000 sheets of paper similarly as mentioned above was irradiated with halogen lamps different in light exposure intensity for 50 msec, and the light exposure intensity of the halogen lamp until the surface voltage was lowered to −350 V after 0.2 second. The property of non-used one was 3.6 mJ/m$^2$.

TABLE 11

| | Example | | | | | | | | | |
|---|---|---|---|---|---|---|---|---|---|---|
| | 18 | 19 | 20 | 21 | 22 | 23 | 24 | 25 | 26 | 27 |
| Initial stage | | | | | | | | | | |
| Image density | 1.3 | 1.3 | 1.3 | 1.3 | 1.2 | 1.2 | 1.2 | 1.3 | 1.2 | 1.2 |
| Fogging density (%) | 0.4 | 0.4 | 0.4 | 0.4 | 0.6 | 0.6 | 0.3 | 0.2 | 0.3 | 1.0 |
| Resolution | 6.3 | 6.3 | 6.3 | 6.3 | 6.3 | 6.3 | 6.3 | 6.3 | 6.3 | 5.0 |
| Toner flying | 1 | 1 | 1 | 1 | 1 | 1 | 1 | 1 | 1 | 1 |
| Light response (V) | 100 | 100 | 100 | 100 | 100 | 100 | 100 | 100 | 100 | 100 |
| Sensitivity (mJ/m$^2$) | 3.6 | 3.6 | 3.6 | 3.6 | 3.6 | 3.6 | 3.6 | 3.6 | 3.6 | 3.6 |
| Printing after 700,000 sheets of paper | | | | | | | | | | |
| Image density | 1.1 | 1.2 | 1.3 | 1.2 | 1.1 | 1.1 | 1.1 | 1.3 | 1.1 | 1.2*1 |
| Fogging density (%) | 0.5 | 0.5 | 0.4 | 0.5 | 0.8 | 0.8 | 0.5 | 0.4 | 0.5 | 2.0 |
| Resolution | 6.3 | 6.3 | 6.3 | 6.3 | 5.0 | 5.0 | 6.3 | 6.3 | 6.3 | 3.2 |
| Toner flying | 1 | 1 | 1 | 1 | 1 | 1 | 1 | 1 | 1 | 5 |
| Surface appearance of photoreceptor*3 | O | O | O | O | O | O | O | O | O | O |
| Light response (V) | 110 | 120 | 110 | 120 | 120 | 120 | 110 | 120 | 120 | 110 |
| Sensitivity (mJ/m$^2$) | 3.8 | 3.8 | 3.7 | 3.8 | 3.7 | 3.7 | 3.7 | 3.9 | 3.8 | 3.7 |

| | Example | | | Comparative Example | | | | | |
|---|---|---|---|---|---|---|---|---|---|
| | 28 | 29 | 30 | 6 | 7 | 8 | 9 | 10 | 11 |
| Initial stage | | | | | | | | | |
| Image density | 1.2 | 1.2 | 1.1 | 1.0 | 1.3 | 1.3 | 1.0 | 0.9 | 1.3 |
| Fogging density (%) | 0.8 | 0.4 | 0.5 | 0.8 | 1.0 | 1.5 | 0.6 | 0.4 | 0.5 |

TABLE 11-continued

| | | | | | | | | | |
|---|---|---|---|---|---|---|---|---|---|
| Resolution | 5.0 | 6.3 | 6.3 | 6.3 | 5.0 | 5.0 | 5.0 | 5.0 | 6.3 |
| Toner flying | 1 | 1 | 1 | 1 | 1 | 4 | 1 | 1 | 1 |
| Light response (V) | 100 | 100 | 100 | 100 | 100 | 100 | 100 | 100 | 100 |
| Sensitivity (mJ/m$^2$) | 3.6 | 3.6 | 3.6 | 3.6 | 3.6 | 3.6 | 3.6 | 3.6 | 3.6 |
| Printing after 700,000 sheets of paper | | | | | | | | | |
| Image density | 1.1*2 | 1.2*2 | 0.7 | 0.4 | 1.3*1 | 1.2*1 | 0.6 | 0.5 | 1.3*2 |
| Fogging density (%) | 1.8 | 1.7 | 0.8 | 0.4 | 2.0 | 2.2 | 0.6 | 0.4 | 1.8 |
| Resolution | 3.2 | 4.0 | 4.0 | 2.5 | 4.0 | 3.2 | 2.5 | 2.5 | 4.0 |
| Toner flying | 5 | 5 | 4 | 1 | 5 | 5 | 1 | 1 | 5 |
| Surface appearance of photoreceptor*3 | O | O | O | O | O | O | O | O | O |
| Light response (V) | 120 | 120 | 150 | 150 | 110 | 110 | 150 | 150 | 120 |
| Sensitivity (mJ/m$^2$) | 3.9 | 3.9 | 4.0 | 3.8 | 3.7 | 3.7 | 4.0 | 3.9 | 3.7 |

Note
*1: Stopped at printing 100,000 sheets of paper.
*2: Stopped at printing 200,000 sheets of paper.
*3: O Adhesion of magnetic powder was not admitted.
X Blackened by adhesion of magnetic powder As shown in Table 11, good properties are not always obtained depending on conditions when nothing is added to the toner matrix (Example 27), only silica powder is added to the toner matrix (Example 28), and only magnetic powder is added to the toner matrix (Example 29). Further, when a magnetic powder having an average particle size of larger than 1.5 μm is used (Example 30), good properties are not obtained.

EXAMPLES 31 TO 39

(1) Production of toners and developers

Final toners and developers were obtained by dispersing the materials shown in Table 12 using a V type mixer.

(2) Evaluation

Evaluation was made in the same manner as Example 18. The results are shown in Table 13.

TABLE 12

(Unit: parts)

| | | Example | | | | | | | | |
|---|---|---|---|---|---|---|---|---|---|---|
| | | 31 | 32 | 33 | 34 | 35 | 36 | 37 | 38 | 39 |
| Toner | | | | | | | | | | |
| Toner matrix | BT-1 | 100 | | | | | | | | |
| | BT-2 | | 100 | | | | | | | |
| | BT-3 | | | 100 | | | | | | |
| | BT-4 | | | | 100 | | | | | |
| | BT-5 | | | | | 100 | | | | |
| | BT-6 | | | | | | 100 | | | |
| | BT-7 | | | | | | | 100 | | |
| | BT-8 | | | | | | | | 100 | |
| | BT-9 | | | | | | | | | 100 |
| Silica powder | Aerosil R-972 | 0.5 | | 0.3 | 0.7 | | 0.5 | 0.3 | 0.1 | 0.3 |
| | Tullanox 500 | | 0.2 | | | 0.3 | | | | |
| Magnetic powder | MG-1 | 1.0 | | | | | 1.0 | 1.0 | 1.0 | |
| | MG-2 | | 1.5 | | 0.5 | 0.5 | | | | |
| | MG-3 | | | 1.0 | 0.5 | | | | 1.0 | 1.0 |
| | MG-4 | | | | | | | | | |
| Metal salt of fatty acid | Zinc stearate | 0.05 | 0.02 | 0.1 | 0.1 | 0.05 | 0.03 | 0.05 | | 0.03 |
| | Aluminum stearate | | | | 0.2 | 0.3 | 0.02 | | 0.1 | |
| Other modifier | Titanium oxide | | 0.1 | | | | | | | |
| | Aluminum oxide | 0.05 | | | | | | | | |
| | Zinc oxide | | | | 0.1 | | | | 0.05 | |
| | Magnesium oxide | | | | | | 0.05 | | | |
| | Calcium carbonate | | | | | | 0.05 | | | |
| | Poly(methyl methacrylate) | | | | | 0.1 | | | | |
| Carrier | | | | | | | | | | |
| C-1 | | O | | | | | | | | |
| C-2 | | | O | O | O | O | O | O | O | O |
| Toner concentration (%) | | 3 | 4 | 3 | 3 | 2 | 1 | 3 | 5 | 3 |

TABLE 13

| | Example | | | | | | | | |
|---|---|---|---|---|---|---|---|---|---|
| | 31 | 32 | 33 | 34 | 35 | 36 | 37 | 38 | 39 |
| Initial stage | | | | | | | | | |
| Image density | 1.3 | 1.3 | 1.3 | 1.3 | 1.3 | 1.3 | 1.3 | 1.3 | 1.3 |
| Fogging density (%) | 0.4 | 0.3 | 0.6 | 0.6 | 0.6 | 0.4 | 0.3 | 0.5 | 0.3 |
| Resolution | 6.3 | 6.3 | 6.3 | 6.3 | 6.3 | 6.3 | 6.3 | 6.3 | 6.3 |

TABLE 13-continued

| | Example | | | | | | | | |
|---|---|---|---|---|---|---|---|---|---|
| | 31 | 32 | 33 | 34 | 35 | 36 | 37 | 38 | 39 |
| Toner flying | 1 | 1 | 1 | 1 | 1 | 1 | 1 | 1 | 1 |
| Light response (V) | 100 | 100 | 100 | 100 | 100 | 100 | 100 | 100 | 100 |
| Sensitivity (mJ/m$^2$) | 3.6 | 3.6 | 3.6 | 3.6 | 3.6 | 3.6 | 3.6 | 3.6 | 3.6 |
| After printing 700,000 sheets of paper | | | | | | | | | |
| Image density | 1.1 | 1.2 | 1.3 | 1.3 | 1.2 | 1.1 | 1.3 | 1.2 | 1.3 |
| Fogging density (%) | 0.6 | 0.4 | 0.6 | 0.5 | 0.8 | 0.6 | 0.3 | 0.5 | 0.5 |
| Resolution | 6.3 | 6.3 | 6.3 | 6.3 | 5.0 | 5.0 | 6.3 | 6.3 | 6.3 |
| Toner flying | 1 | 1 | 1 | 1 | 3 | 3 | 1 | 1 | 1 |
| Surface appearance of photoreceptor | O | O | O | O | O | O | O | O | O |
| Light response (V) | 110 | 120 | 110 | 120 | 120 | 120 | 110 | 120 | 120 |
| Sensitivity (mJ/m$^2$) | 3.8 | 3.8 | 3.7 | 3.8 | 3.7 | 3.7 | 3.7 | 3.9 | 3.8 |

EXAMPLES 40 TO 48

(1) Production of toners

Final toners were obtained by dispersing materials shown in Table 14 using a V type mixer. Developers were prepared by mixing the toners with carriers shown in Table 14 in proportions shown in Table 14.

TABLE 14

(Unit: %)

| | | Example | | | | | | | | |
|---|---|---|---|---|---|---|---|---|---|---|
| | | 40 | 41 | 42 | 43 | 44 | 45 | 46 | 47 | 48 |
| Toner | | | | | | | | | | |
| Toner matrix | BT-1 | 100 | | | | | | | | |
| | BT-2 | | 100 | | | | | | | |
| | BT-3 | | | 100 | | | | | | |
| | BT-4 | | | | 100 | | | | | |
| | BT-5 | | | | | 100 | | | | |
| | BT-6 | | | | | | 100 | | | |
| | BT-7 | | | | | | | 100 | | |
| | BT-8 | | | | | | | | 100 | |
| | BT-9 | | | | | | | | | 100 |
| Silica powder | Aerosil R-972 | 0.3 | | 0.5 | 0.3 | 0.7 | | 0.3 | 0.1 | |
| | Tullanox 500 | | 0.2 | | | | 0.5 | | | 0.3 |
| Magnetic powder*1 | MG-5 | | | | 0.5 | | 1.0 | 0.1 | 1.0 | |
| | MG-6 | | 1.0 | | | | | | | |
| | MG-7 | | | 1.0 | 0.5 | 1.5 | | | | |
| | MG-8 | 0.8 | | | | | | | | 1.0 |
| | MG-4 | | | | | | | 0.5 | | |
| Other modifier | Aluminum oxide | | | | 0.05 | | | | | 0.1 |
| | Zinc stearate | | | 0.05 | 0.05 | | | | | |
| | Zinc oxide | | | | | | | 0.1 | 0.05 | |
| | Magnesium oxide | | | | | | | | 0.05 | 0.05 |
| | Calcium carbonate | | | | | | | | 0.1 | |
| | Poly(methyl methacrylate) | | | | | 0.1 | | | | |
| Carrier | | | | | | | | | | |
| C-1 | | O | | | | | | | | |
| C-1 | | | O | O | O | O | O | O | O | O |
| Toner concentration (%) | | 3 | 3 | 4 | 3 | 2 | 1 | 3 | 5 | 3 |

Note on Table 14

*1: MG-5: magnetite obtained by classifying FB (mfd. by Okamura Seiyu K.K.), having an average particle size of about 0.01 μm, mag. intensity 64 emu/g.

MG-6: magnetite obtained by classifying FB (mfd. by Okamura Seiyu K.K.), having an average particle size of about 0.05 μm, mag. intensity 66 emu/g.

MG-7: magnetite obtained by classifying FB (mfd. by Okamura Seiyu K.K.), having an average particle size of about 0.08 μm, mag. intensity 66 emu/g.

MG-8: surface treated magnetite obtained by mixing 90% of MG-5 and 10% of zinc stearate using a Tarbra Shaken mixer, mag. intensity 63 emu/g.

(2) Evaluation

An organic photoconductive body containing as a charge generating material titanyl phthalocyanine, and as a change transport material a mixture of 1,1-diphenylhydrazino-3-methylidene-N-methylcarbazole, 1,1-diphenyl-3-[2′,2′-(di-4″-methoxyphenyl)]vinylhydrazone and 2,4-bis(n-octylthio)-6-(hydroxy-3,5-di-tert-butylanilino)-1,3,5-triazine was subjected to corona voltage to negatively charge at about −700 V. After information was written by semiconductor laser, printing was conducted using a high speed cut sheet printer wherein the peripheral speed of photoreceptor reverse developed by a magnetic brushing method was about 70 cm/sec, development gap 1.7 mm and bias voltage −400 v.

The results are shown in Table 15.

The wearing degree of organic photoconductive body was evaluated by measuring the film thickness of the organic photoconductive material after printing using a surface shape measuring device Dektak 3030 (mfd. by ULVAC).

TABLE 15

| | Example No. | | | | | | | | |
|---|---|---|---|---|---|---|---|---|---|
| | 40 | 41 | 42 | 43 | 44 | 45 | 46 | 47 | 48 |
| Initial stage | | | | | | | | | |
| Image density | 1.3 | 1.3 | 1.4 | 1.4 | 1.3 | 1.2 | 1.2 | 1.3 | 1.3 |
| Fogging density | 0.5 | 0.4 | 0.4 | 0.5 | 0.3 | 0.5 | 0.4 | 0.4 | 0.4 |
| Resolution | 6.3 | 6.3 | 6.3 | 6.3 | 6.3 | 6.3 | 6.3 | 6.3 | 6.3 |
| Toner flying | 1 | 1 | 1 | 1 | 1 | 1 | 1 | 1 | 1 |
| After printing 700,000 sheets of paper | | | | | | | | | |
| Image density | 1.3 | 1.3 | 1.4 | 1.3 | 1.3 | 1.1 | 1.1 | 1.3 | 1.2 |
| Fogging density | 0.5 | 0.5 | 0.5 | 0.5 | 0.4 | 0.5 | 0.5 | 0.5 | 0.5 |
| Resolution | 6.3 | 6.3 | 6.3 | 6.3 | 5.0 | 5.0 | 5.0 | 6.3 | 6.3 |
| Toner flying | 1 | 1 | 1 | 1 | 3 | 1 | 3 | 1 | 1 |
| Wearing degree of organic photoconductive body (μm)*1 | 16 | 16 | 16 | 16 | 15 | 16 | 15 | 16 | 16 |

Note
*1 Film thickness of non-use product was 17 μm.

EXAMPLES 49 TO 55, COMPARATIVE EXAMPLES 12 TO 17

(1) Production of toner matrix

After preliminary mixing materials shown in Table 16 using a Henschel mixer, the resulting mixture was melt kneaded using a biaxial kneader (or twin screw). After cooling, the mixture was pulverized using a hammer mill and a jet mill to give a toner matrix having an average particle size of 10 to 13 μm.

(2) Production of toners and developers

Final toners and developers were obtained by mixing materials shown in Table 17 using a V type mixer.

TABLE 16

(Unit: %)

| | BT- | | | | | BH- | | | | |
|---|---|---|---|---|---|---|---|---|---|---|
| | 10 | 11 | 12 | 13 | 14 | 5 | 6 | 7 | 8 | 9 |
| Binder resin | | | | | | | | | | |
| Copolymer CP-1 | 43 | | | 85 | | 43 | | | | |
| Copolymer CP-2 | | 85 | | | | | 85 | | | |
| Copolymer CP-3 | 43 | | | | 87 | 43 | | 86.8 | 81 | 88 |
| Copolymer CP-4 | | | 86 | | | | | | | |
| Charge control agent | | | | | | | | | | |
| Formula (I) (3) - Compound | 1 | | 2.1 | | 0.1 | 2 | | | 5 | |
| (2) - Compound | | 0.3 | | 0.7 | | | | 0.1 | | |
| Formula (II) (1) - Compound | 1 | | | 0.3 | 0.5 | | | 0.1 | 2 | |
| (2) - Compound | | 2.7 | 0.9 | | 0.4 | | 3 | | | |
| Carbon black | | | | | | | | | | |
| Carbon black #44 | 5 | | 4 | 5 | 10 | 5 | | 10 | 10 | 10 |
| Mogul L | | 10 | | 6 | | | 10 | | | |
| Valcan XC-72 | 5 | | 6 | | | 5 | | | | |
| Additive | | | | | | | | | | |
| Viscol 660P | 1 | 2 | 1 | | 1 | 1 | 2 | | 2 | 2 |
| Viscol 550P | 1 | | | 3 | 1 | 1 | | 3 | | |

TABLE 17

(Unit: %)

| | | Example | | | | | | | Comparative Example | | | | | |
|---|---|---|---|---|---|---|---|---|---|---|---|---|---|---|
| | | 49 | 50 | 51 | 52 | 53 | 54 | 55 | 12 | 13 | 14 | 15 | 16 | 17 |
| Toner | | | | | | | | | | | | | | |
| Toner Matrix | BT-10 | 100 | | | | | 50 | | | | | | | |
| | BT-11 | | 100 | | | | | | | | | | | |
| | BT-12 | | | 100 | | | | | | | | | | |
| | BT-13 | | | | 100 | | 50 | | | | | | | |
| | BT-14 | | | | | 100 | | 100 | | | | | | |
| | BH-5 | | | | | | | | 100 | | | | | |
| | BH-6 | | | | | | | | | 100 | | | | |
| | BH-7 | | | | | | | | | | 100 | | | |
| | BH-8 | | | | | | | | | | | 100 | | |
| | BH-9 | | | | | | | | | | | | 100 | 100 |
| Silica powder | Aerosil R-972 | 0.4 | | 0.3 | 0.3 | 0.5 | 0.6 | 0.8 | | | | | | 0.3 |
| | Tullanox 500 | | 0.3 | | 0.1 | | | | | | | | | |
| Magnetite *1 | MG-9 | 1.5 | | | | | | 1.0 | | | | | | 1.0 |
| | MG-10 | | 1.0 | | | | | | | | | | | |
| | MG-11 | | | 1.2 | | | | | | | | | | |
| | MG-12 | | | | 2.0 | | 2.0 | | | | | | | |
| | MG-13 | | | | | 3.0 | | | | | | | | |
| | MG-14 | | 0.1 | | | | 0.2 | | | | | | | |
| | MG-15 | | | | | | | 0.5 | | | | | | |

TABLE 17-continued (Unit: %)

| | | Example | | | | | | | Comparative Example | | | | | |
|---|---|---|---|---|---|---|---|---|---|---|---|---|---|---|
| | | 49 | 50 | 51 | 52 | 53 | 54 | 55 | 12 | 13 | 14 | 15 | 16 | 17 |
| Metal salt of fatty acid | Zinc stearate | 0.05 | | | 0.02 | 0.2 | 0.05 | | | | | | | 0.1 |
| | Zinc oleate | | 0.1 | | | | | 0.05 | | | | | | |
| | Aluminum stearate | | | 0.1 | 0.02 | | 0.3 | | | | | | | |
| Other modifier | Aluminum oxide | | 0.01 | | | | | | | | | | | |
| | Titanium oxide | | | | | | | 0.01 | | | | | | |
| | Poly(methyl methacrylate) | | | | | 0.05 | | | | | | | | |
| Carrier *2 | | | | | | | | | | | | | | |
| C - 3 | | | o | | o | | o | o | o | o | o | o | o | o |
| C - 4 | | o | | o | | o | | | | | | | | |
| Toner concentration (%) | | 4 | 4 | 3 | 4 | 2 | 4 | 1 | 3 | 3 | 3 | 3 | 3 | 3 |

Note on Table 17
*1: Magnetite
MG-9: average particle size 0.4–0.5 μm (64 emu/g)
MG-10: average particle size 0.5–0.6 μm (65 emu/g)
MG-11: average particle size 0.7–0.8 μm (66 emu/g)
MG-12: Surface treated magnetite obtained by mixing 90% of MG-2 and 10% of zinc stearate using a shaker mixer (63 emu/g)
MG-13: Surface treated magnetite obtained by mixing 95% of MG-10 and 5% of hydroxy-stearic acid using a shaker mixer (63 emu/g)
MG-14: average particle size about 0.01 μm (66 emu/g)
MG-15: average particle size about 1.5 μm (64 emu/g)
In the parentheses, magnetization intensity is shown at external magnetic field of 1 Koersted.
*2: Carrier
C-3: copper-zincе ferrite carrier surface coated with hydroxy group-containing acrylic resin-melamine resin having an apparent density of 2.7 g/cm$^3$, saturated magnetization 64 emu/g, and the following particle size distribution:
74–105 μm: about 90%
63–74 μm: about 10%
C-4: copper-zinc ferrite carrier surface coated with hydroxy group-containing acrylic resin-melamine resin having an apparent density of 2.6 g/cm$^3$, saturated magnetization 65 emu/g, and the following particle size distribution:
74–105 μm: about 60%
63–74 μm: about 10%
44–63 μm: about 30%

(3) Evaluation

On the surface of cylinder aluminum support, an organic photoconductive drum (photoreceptor drum) was reverse developed by a magnetic brushing method. The photoreceptor drum contained as a binder resin a polycarbonate resin having repeating units of the formula:

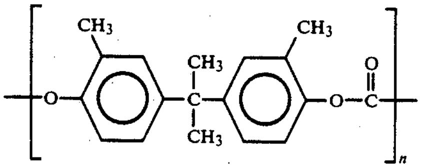

a charge generating layer containing titanyl phthalocyanine as a charge generating material, and formed thereon a charge transport layer containing as a charge transport material a mixture of about 70% of 1,1-diphenylhydrazino-3-methylidene-N-methylcarbazole, about 25% of 1,1-diphenyl-3-[2,2'-(di-4''-methoxyphenyl]vinylhydrazone, and about 5% of 2.4-bis[(n-octylthio)-6-hydroxy-3,5-di-tert-butylanilino}-1,3,5-triazine. The photoreceptor drum was installed in a high speed cut sheet printer with peripheral speed of drum of about 700 mm/sec, development gap of 1.7 mm and bias voltage of 400 V.

Using the printer and the developers mentioned above, the evaluation was made as follows After negatively charging the organic photoconductive drum at about −700 V by corona voltage, information was written using a semiconductor laser. After developing using each developer mentioned above, printing was repeated by transferring to paper and fixing under a temperature of 15° to 30° C. and a humidity of 30 to 70% RH. The results are shown in Table 18.

Fogging density at image back portions was evaluated by measuring difference in reflectance with regard to non-printed paper using a Color Difference meter D25-2 (mfd. by Hunter Associates Laboratory, Inc.).

Jam generation frequency was evaluated in the same manner as described in Example 9.

Other properties were evaluated in the same manner as described in Example 18.

TABLE 18

| | | Example | | | | | | | Comparative Example | | | | | |
|---|---|---|---|---|---|---|---|---|---|---|---|---|---|---|
| | | 49 | 50 | 51 | 52 | 53 | 54 | 55 | 12 | 13 | 14 | 15 | 16 | 17 |
| Initial stage | Image density | 1.4 | 1.3 | 1.3 | 1.2 | 1.3 | 1.2 | 1.1 | 1.0 | 1.2 | 1.2 | 0.9 | 1.1 | 1.2 |
| | Fogging density | 0.2 | 0.4 | 0.1 | 0.5 | 0.5 | 0.5 | 0.3 | 0.3 | 0.6 | 0.7 | 0.3 | 1.0 | 0.7 |
| | Resolution | 6.3 | 6.3 | 6.3 | 6.3 | 6.3 | 6.3 | 6.3 | 5.0 | 6.3 | 6.3 | 5.0 | 5.0 | 5.0 |
| | Toner flying | 1 | 1 | 1 | 1 | 1 | 1 | 1 | 1 | 2 | 2 | 1 | 4 | 3 |
| | Light respone (V) | 100 | 100 | 100 | 100 | 100 | 100 | 100 | 100 | 100 | 100 | 100 | 100 | 100 |
| | Sensitivity (mJ/m$^2$) | 3.6 | 3.6 | 3.6 | 3.6 | 3.6 | 3.6 | 3.6 | 3.6 | 3.6 | 3.6 | 3.6 | 3.6 | 3.6 |
| After printing 700,000 sheets of paper | Image density | 1.3 | 1.2 | 1.3 | 1.2 | 1.2 | 1.2 | 1.1 | 0.5 | 1.2 | 1.2 | 0.4 | 1.0*1 | 1.0*1 |
| | Fogging density | 0.2 | 0.3 | 0.1 | 0.6 | 0.5 | 0.6 | 0.3 | 0.2 | 2.2 | 2.0 | 0.1 | 2.5 | 2.5 |
| | Resolution | 6.3 | 6.3 | 6.3 | 6.3 | 6.3 | 5.0 | 5.0 | 3.2 | 3.2 | 3.2 | 3.2 | 3.2 | 3.2 |
| | Toner flying | 1 | 1 | 1 | 2 | 2 | 2 | 1 | 1 | 5 | 5 | 5 | 5 | 5 |
| | Surface appearance of photoreceptor | o | o | o | o | o | o | o | o | o | o | o | o | o |
| | Light response (V) | 110 | 120 | 110 | 120 | 120 | 110 | 110 | 120 | 120 | 110 | 110 | 120 | 120 |
| | Sensitivity (mJ/m$^2$) | 3.7 | 3.7 | 3.7 | 3.7 | 3.7 | 3.7 | 3.7 | 3.7 | 3.8 | 3.7 | 3.7 | 3.8 | 3.8 |

TABLE 18-continued

| | Example | | | | | | | Comparative Example | | | | | |
|---|---|---|---|---|---|---|---|---|---|---|---|---|---|
| | 49 | 50 | 51 | 52 | 53 | 54 | 55 | 12 | 13 | 14 | 15 | 16 | 17 |
| Jam generation frequency (times) | 0 | 0 | 0 | 0 | 0 | 0 | 0 | 6 | 7 | 7 | 8 | 10 | 10 |

(Note)
*[1]Stopped at the printing of 100,000 sheets of paper

EXAMPLES 56 TO 64, COMPARATIVE EXAMPLES 18 TO 23

(1) Production of toner matrix

After preliminarily mixing raw materials shown in Table 19 using a Henschel mixer, the resulting mixture was melt kneaded using a biaxial kneader. After cooling, the mixing was pulverized using a hammer mill and a jet mill to give a toner matrix having an average particle size of 10 to 13 μm.

(2) Production of toner and developer

Final toners and developers were obtained by mixing compositions shown in Table 20 using a V type mixer.

(3) Evaluation

Properties were evaluated in the same manner as described in Example 49.

The results are shown in Table 21.

TABLE 19

(Unit: %)

| | | BT - | | | | | BH - | | | | |
|---|---|---|---|---|---|---|---|---|---|---|---|
| | | 15 | 16 | 17 | 18 | 19 | 10 | 11 | 12 | 13 | 14 |
| Binder resin | Copolymer CP-1 | 56 | | | 58 | | 56 | 56 | 56 | 56 | 56 |
| | Copolymer CP-2 | | | 85 | | | | | | | |
| | Copolymer CP-3 | 30 | | | | 86.8 | 30 | 30 | 32.1 | 25.3 | 32.3 |
| | Copolymer CP-4 | | 87 | | 30 | | | | | | |
| Charge control agent | Formula (I) ③ - - - Compound | 1.3 | | 1.8 | 0.3 | 0.2 | | | 0.1 | | |
| | Formula (I) ② - - - Compound | | 0.5 | | 0.3 | | 2.3 | | | 5 | |
| | Formula (III)*[1] ① - - - Compound | 1 | | | 0.4 | 0.5 | | 2.3 | 0.1 | 2 | |
| | Formula (III)*[1] ② - - - Compound | | 1.5 | 1.2 | | 0.5 | | | | | |
| Carbon black | Carbon black #44 | | 7 | 8 | 10 | 3 | | | | | |
| | Mogul L | 10 | | 2 | | 3 | 10 | 10 | 10 | 10 | 10 |
| | Valcan XC-72 | | 3 | | | 4 | | | | | |
| Additive | Viscol 660P | | 1 | | 1 | | | | | | |
| | Viscol 550P | 1.7 | | 2 | | 2 | 1.7 | 1.7 | 1.7 | 1.7 | 1.7 |

Note on Table 19
*[1]Compound of Formula (III) - ①

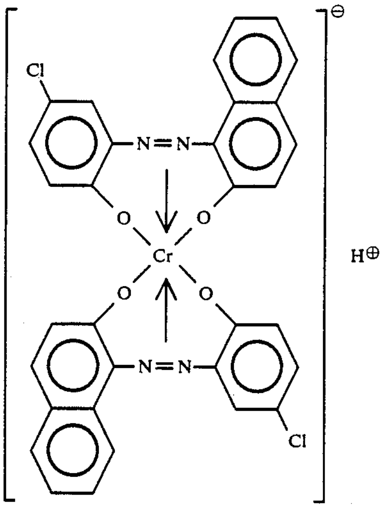

Compound of Formula (III) - ②

TABLE 19-continued

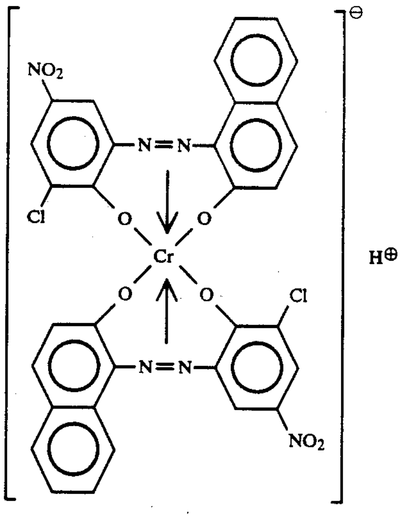

TABLE 20

(Unit: %)

| | | | Example | | | | | | | | | Comparative Example | | | | | |
|---|---|---|---|---|---|---|---|---|---|---|---|---|---|---|---|---|---|
| | | | 56 | 57 | 58 | 59 | 60 | 61 | 62 | 63 | 64 | 18 | 19 | 20 | 21 | 22 | 23 |
| Toner | Toner matrix | BT-15 | 100 | | | | | 50 | | 100 | 100 | | | | | | |
| | | BT-16 | | 100 | | | | | | | | | | | | | |
| | | BT-17 | | | 100 | | | | | | | | | | | | |
| | | BT-18 | | | | 100 | | 50 | | | | | | | | | |
| | | BT-19 | | | | | 100 | | 100 | | | | | | | | |
| | | BH-10 | | | | | | | | | | 100 | | | | | |
| | | BH-11 | | | | | | | | | | | 100 | | | | |
| | | BH-12 | | | | | | | | | | | | 100 | | | |
| | | BH-13 | | | | | | | | | | | | | 100 | | |
| | | BH-14 | | | | | | | | | | | | | | 100 | 100 |
| | Silica powder | Aerosil R-972 | 0.4 | | 0.3 | 0.3 | 0.5 | 0.6 | 0.8 | 0.3 | | | | | | | 0.3 |
| | | Tullanox 500 | | 0.3 | | 0.1 | | | | | 0.3 | | | | | | |
| | Magnetite | MG-9 | 1.5 | | | | | | 1.0 | | | | | | | | 1.0 |
| | | MG-10 | | 0.9 | | | | | | | | | | | | | |
| | | MG-11 | | | 1.2 | | | | | 1.0 | 0.5 | | | | | | |
| | | MG-12 | | | | 1.8 | | 0.7 | | | | | | | | | |
| | | MG-13 | | | | | 1.0 | | | | | | | | | | |
| | | MG-16*1 | | | | | | | | 0.2 | | | | | | | |
| | | MG-14 | | 0.1 | | | | 0.2 | | | 0.1 | | | | | | |
| | | MG-15 | | | | | | | 0.5 | | | | | | | | |
| | Other modifier | Aluminum oxide | | 0.01 | | | | | | | | | | | | | |
| | | Titanium oxide | | | | | | | 0.01 | | | | | | | | |
| | | Poly(methyl methacrylate) | | | | | 0.05 | | | | | | | | | | |
| | | Zinc stearate | 0.05 | | | 0.02 | 0.2 | 0.05 | | | | | | | | | 0.1 |
| | | Zinc oleate | | 0.07 | | | | | 0.05 | 0.1 | 0.1 | | | | | | |
| | | Aluminum stearate | | | 0.01 | 0.02 | | 0.3 | | | | | | | | | |
| Carrier | C-3 | | | o | | o | | o | o | o | o | o | o | o | o | o | o |
| | C-4 | | o | | o | | o | | | | | | | | | | |
| Toner contentration (%) | | | 4 | 4 | 3 | 4 | 2 | 4 | 1 | 3 | 3 | 3 | 3 | 3 | 3 | 3 | 3 |

(Note)
*1: MG-16: Magnetite having an average particle size of 0.2-0.3 μm (64 emu/g)

TABLE 21

| | | Example | | | | | | | | |
|---|---|---|---|---|---|---|---|---|---|---|
| | | 56 | 57 | 58 | 59 | 60 | 61 | 62 | 63 | 64 |
| Initial stage | Image density | 1.3 | 1.3 | 1.4 | 1.3 | 1.3 | 1.3 | 1.1 | 1.3 | 1.2 |
| | Fogging density | 0.2 | 0.4 | 0.3 | 0.4 | 0.5 | 0.2 | 0.5 | 0.4 | 0.2 |
| | Resolution | 6.3 | 6.3 | 6.3 | 6.3 | 6.3 | 6.3 | 6.3 | 6.3 | 6.3 |
| | Toner flying | 1 | 1 | 1 | 1 | 1 | 1 | 1 | 1 | 1 |
| | Light response (V) | 100 | 100 | 100 | 100 | 100 | 100 | 100 | 100 | 100 |
| | Sensitivity ($mJ/m^2$) | 3.6 | 3.6 | 3.6 | 3.6 | 3.6 | 3.6 | 3.6 | 3.6 | 3.6 |
| After printing 700,000 sheets | Image density | 1.3 | 1.2 | 1.3 | 1.3 | 1.2 | 1.3 | 1.1 | 1.2 | 1.2 |
| | Fogging density | 0.2 | 0.5 | 0.3 | 0.5 | 0.5 | 0.3 | 0.5 | 0.4 | 0.4 |
| | Resolution | 6.3 | 6.3 | 6.3 | 6.3 | 6.3 | 5.0 | 5.0 | 6.3 | 6.3 |
| | Toner flying | 1 | 1 | 1 | 2 | 2 | 2 | 1 | 1 | 1 |

TABLE 21-continued

| | | | | | | | | | | |
|---|---|---|---|---|---|---|---|---|---|---|
| of paper | Surface appearance of photoacceptor | o | o | o | o | o | o | o | o | o |
| | Light response (V) | 110 | 120 | 110 | 120 | 120 | 110 | 110 | 110 | 110 |
| | Sensitivity (mJ/m$^2$) | 3.7 | 3.7 | 3.7 | 3.7 | 3.7 | 3.7 | 3.7 | 3.7 | 3.7 |
| | Jam generation frequency (time) | 0 | 0 | 0 | 0 | 0 | 0 | 0 | 0 | 0 |

| | | Comparative Example | | | | | |
|---|---|---|---|---|---|---|---|
| | | 18 | 19 | 20 | 21 | 22 | 23 |
| Initial stage | Image density | 1.0 | 1.2 | 1.2 | 0.9 | 1.1 | 1.2 |
| | Fogging density | 0.3 | 0.6 | 0.7 | 0.3 | 1.0 | 0.7 |
| | Resolution | 5.0 | 6.3 | 6.3 | 5.0 | 5.0 | 5.0 |
| | Toner flying | 1 | 2 | 2 | 1 | 4 | 3 |
| | Light response (V) | 100 | 100 | 100 | 100 | 100 | 100 |
| | Sensitivity (mJ/m$^2$) | 3.6 | 3.6 | 3.6 | 3.6 | 3.6 | 3.6 |
| After printing 700,000 sheets of paper | Image density | 0.5 | 1.2 | 1.2 | 0.4 | 1.0*1 | 1.0*1 |
| | Fogging density | 0.2 | 2.2 | 2.0 | 0.1 | 2.5 | 2.5 |
| | Resolution | 3.2 | 3.2 | 3.2 | 3.2 | 3.2 | 3.2 |
| | Toner flying | 1 | 5 | 5 | 5 | 5 | 5 |
| | Surface appearance of photoacceptor | o | o | o | o | o | o |
| | Light response (V) | 120 | 120 | 110 | 110 | 120 | 120 |
| | Sensitivity (mJ/m$^2$) | 3.7 | 3.8 | 3.7 | 3.7 | 3.8 | 3.8 |
| | Jam generation frequency (time) | 6 | 7 | 7 | 8 | 10 | 10 |

(Note)
*1Stopped at the printing of 100,000 sheets of paper.

As is clear from the above results, the dry toner composition, the dry developer and the process for forming images of the present invention can maintain good properties such as high quality of printed letters and images, non-toner flying, and the like, even if printed in high speed for a long period of time. Further, even if combined with a photoreceptor containing an organic photoconductive substance, deterioration of properties of the photoreceptor can be prevented sufficiently.

In addition, even if high speed printers are used, desirable good properties can be maintained. Further, even when a ultrahigh speed cut sheet printer is used for installation, high reliability is shown without causing poor running properties.

What is claimed is:

1. A dry toner composition for mixing with a carrier comprising (A) a binder resin;

(B) a colorant;

(C) charge control agents comprising a metal complex of oxycarboxylic acid (C-1) represented by the formula:

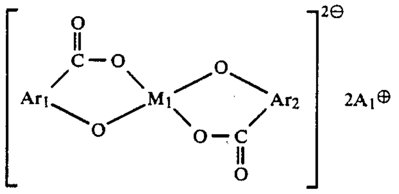

(I)

wherein $Ar_1$ and $Ar_2$ are independently a residue of an aromatic oxycarboxylic acid or a derivative thereof; $M_1$ is a zinc atom; $A_1^{\oplus}$ is a hydrogen ion, a sodium ion, a potassium ion or an ammonium ion, a metal complex of azo compound (C-2) represented by the formula:

(II)

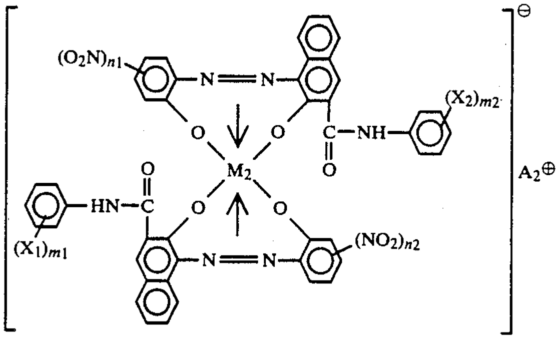

wherein $X_1$ and $X_2$ are independently hydrogen, an alkyl group having 1 to 4 carbon atoms, an alkoxy group having 1 to 4 carbon atoms, a nitro group, or a halogen atom; $m_1$ and $m_2$ are independently an integer of 1 to 3; $n_1$ and $n_2$ are independently an integer of 1 or 2; $M_2$ is a chromium atom; and $A_2^{\oplus}$ is a hydrogen ion, a sodium ion, a potassium ion, or an ammonium ion, and/or represented by the formula:

(III)

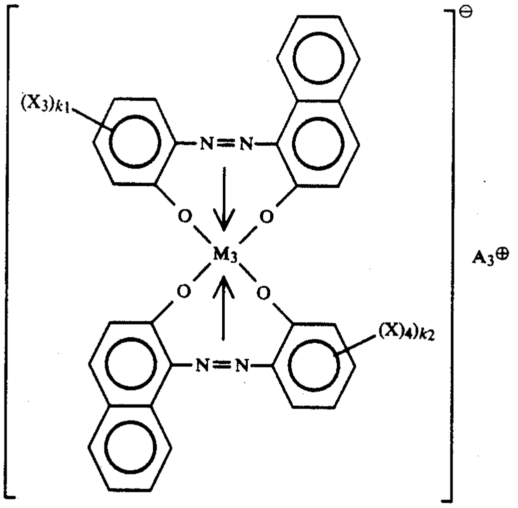

wherein $X_3$ and $X_4$ are independently $-NO_2$, $-CH_3$, $-SO_3H$, $-Cl$ or $-SO_2NH_2$; $k_1$ and $k_2$ are independently an integer of 1 or 2; $M_3$ is a chromium atom; and $A_3^{\oplus}$ is a hydrogen ion, a sodium ion, a potassium ion, or an ammonium ion, the weight ratio of (C-1)/(C-2) being 1/9 to 9/1, and a total weight of (C-1) and (C-2) being 0.5 to 5% by weight; and 0.1 to 1% by weight of a silica powder and 0.05 to 2% by weight of a magnetic powder, each based on the weight of a toner matrix comprising (A), (B) and (C).

2. A dry toner composition according to claim 1, wherein the binder resin (A) contains residual unreacted monomers and solvent in amount of 0.15% by weight or less.

3. A dry toner composition according to claim 2, wherein the binder resin (A) contains styrene-acrylic resin as a major component.

4. A dry toner composition according to claim 1, wherein the colorant (B) is carbon black having an oil absorption of 150 ml/100 g or more, a volatile content of 3.0% by weight or less and a surface area of 240 $m^2/g$ or more.

5. A dry toner composition according to claim 1, which further comprises (D) an additive other than the components (A) to (C) in the toner matrix.

6. A dry toner composition according to claim 5, wherein the contents of individual components in the toner matrix are (A) binder resin 60 to 94.5% by weight, (B) colorant 2 to 15% by weight, (C) charge control agent 0.5 to 5% by weight, and (D) other additive 0 to 30% by weight.

7. A dry toner composition obtained by mixing the toner composition of claim 1 with 0.01 to 0.5% by weight of a metal salt of fatty acid, each based on the weight of the toner matrix of claim 1.

8. A dry toner composition according to claim 1, which is obtained further mixing 1% by weight or less of a modifier based on the weight of the in the toner matrix of claim 1.

9. A dry toner composition according to claim 7, which is obtained further mixing 1% by weight or less of a modifier based on the weight of the toner matrix of claim 1.

10. A dry toner composition according to claim 1, wherein the silica powder has an average particle size of 30 μm or less in terms of primary particles.

11. A dry toner composition according to claim 1, wherein the magnetic powder is a magnetite powder.

12. A dry toner composition according to claim 11, wherein the magnetite has magnetization intensity of 64±4 emu/g under an external magnetic field of 1 Korsted.

13. A dry toner composition according to claim 8, wherein the modifier is at least one member selected from the group consisting of aluminum oxide, zinc oxide, titanium oxide, magnesium oxide, calcium carbonate, and poly(methyl methacrylate).

14. A dry toner composition according to claim 7, wherein the silica powder has an average particle size of 30 mμ or less in terms of primary particles.

15. A dry toner composition according to claim 7, wherein the magnetic powder is a magnetite powder.

16. A dry toner composition according to claim 15, wherein the magnetite has magnetization intensity of 64±4 emu/g under an external magnetic field of 1 Korsted.

17. A dry toner composition according to claim 9, wherein the modifier is at least one member selected from the group consisting of aluminum oxide, zinc oxide, titanium oxide, magnesium oxide, calcium carbonate and poly(methyl methacrylate).

18. A dry toner composition according to claim 7, wherein the metal salt of fatty acid is zinc stearate.

19. A dry developer comprising a dry toner composition of claim 1 and a carrier.

20. A dry developer comprising a dry toner composition of claim 7 and a carrier.

21. A dry developer according to claim 19, wherein the carrier is a ferrite carrier.

22. A dry developer according to claim 21, wherein the ferrite carrier is a copper-zinc ferrite carrier.

23. A dry developer according to claim 21, wherein the ferrite carrier is coated with an acrylic resin.

24. A dry developer according to claim 19, wherein the toner composition has a concentration of 1 to 10% by weight.

25. A process for forming images, which comprises developing a latent static image formed on a photoreceptor containing an organic photoconductive substance using the dry developer of claim 19.

26. A process for forming images, which comprises developing a latent static image formed on a photoreceptor containing an organic photoconductive substance using the dry developer of claim 20.

27. A process according to claim 25, wherein the organic photoconductive substance is a phthalocyanine pigment.

28. A process according to claim 25, wherein the development is carried out by using a high speed printer wherein the peripheral speed of photoreceptor is 50 cm/sec or more.

29. A process according to claim 28, wherein the high speed printer is a cut sheet printer.

30. A process according to claim 25, wherein the photoreceptor comprises a charge generating layer containing titanyl phthalocyanine, and a charge transport layer containing 1,1-diphenylhydrazino-3-methylidene-N-methylcarbazole and 1,1-diphenyl-3-[2',2'-(di-4''-methoxyphenyl)]vinylhydrazone.

31. A dry toner composition according to claim 1, wherein said toner composition is in a high speed printer including a photoreceptor made of an organic photoconductive substance.

* * * * *